US010068533B2

(12) United States Patent
Yamazaki et al.

(10) Patent No.: US 10,068,533 B2
(45) Date of Patent: Sep. 4, 2018

(54) LIQUID CRYSTAL DISPLAY DEVICE AND ELECTRONIC DEVICE

(71) Applicant: Semiconductor Energy Laboratory Co., Ltd., Atsugi-shi, Kanagawa-ken (JP)

(72) Inventors: Shunpei Yamazaki, Setagaya (JP); Jun Koyama, Sagamihara (JP)

(73) Assignee: Semiconductor Energy Laboratory Co., Ltd., Kanagawa-ken (JP)

(*) Notice: Subject to any disclaimer, the term of this patent is extended or adjusted under 35 U.S.C. 154(b) by 190 days.

(21) Appl. No.: 15/095,528

(22) Filed: Apr. 11, 2016

(65) Prior Publication Data

US 2016/0225325 A1 Aug. 4, 2016

Related U.S. Application Data

(63) Continuation of application No. 13/093,157, filed on Apr. 25, 2011, now Pat. No. 9,349,325.

(30) Foreign Application Priority Data

Apr. 28, 2010 (JP) ................................ 2010-103714

(51) Int. Cl.

| | |
|---|---|
| ***G06F 1/00*** | (2006.01) |
| ***G09G 3/34*** | (2006.01) |
| ***G09G 3/36*** | (2006.01) |

(52) U.S. Cl.

CPC ......... *G09G 3/3406* (2013.01); *G09G 3/3648* (2013.01); *G09G 2300/0842* (2013.01);

(Continued)

(58) Field of Classification Search

CPC .. G09G 3/02; G09G 3/34; G09G 3/36; G09G 3/2003; G09G 3/2074; G06T 7/00; H04N 1/60

See application file for complete search history.

(56) References Cited

U.S. PATENT DOCUMENTS 5,731,856 A 3/1998 Kim et al.
5,744,864 A 4/1998 Cillessen et al.

(Continued)

FOREIGN PATENT DOCUMENTS

CN 101634725 A 1/2010
CN 102113414 A 6/2011

(Continued)

OTHER PUBLICATIONS

Korean Office Action (Application No. 2011-0038814) dated Jul. 19, 2017.

(Continued)

*Primary Examiner* — Michael Faragalla

(74) *Attorney, Agent, or Firm* — Robinson Intellectual Property Law Office; Eric J. Robinson

(57) ABSTRACT

It is an object to provide a transmissive liquid crystal display device in which power consumption is reduced and deterioration in display quality is suppressed. As a backlight, a surface-emission light source is employed. The light source is a light source which performs surface light emission, so that the light emission area is large. Accordingly, the backlight can effectively radiate heat. Thus, even in the case where an image signal is not input to a pixel for a long period, the pixel can hold the image signal. In other words, both a reduction in power consumption and a suppression of deterioration in display quality can be realized.

12 Claims, 14 Drawing Sheets
(1 of 14 Drawing Sheet(s) Filed in Color)

(52) U.S. Cl.
CPC ............... *G09G 2320/0214* (2013.01); *G09G 2320/0233* (2013.01); *G09G 2320/04* (2013.01); *G09G 2320/041* (2013.01); *G09G 2320/10* (2013.01); *G09G 2330/021* (2013.01); *G09G 2330/023* (2013.01); *G09G 2340/0435* (2013.01)

(56) References Cited

U.S. PATENT DOCUMENTS 6,294,274 B1 9/2001 Kawazoe et al.
6,377,301 B1 * 4/2002 Hieda .................... H04N 5/335 348/231.99
6,563,174 B2 5/2003 Kawasaki et al.
6,727,522 B1 4/2004 Kawasaki et al.
7,049,190 B2 5/2006 Takeda et al.
7,061,014 B2 6/2006 Hosono et al.
7,064,346 B2 6/2006 Kawasaki et al.
7,105,868 B2 9/2006 Nause et al.
7,211,825 B2 5/2007 Shih et al.
7,282,782 B2 10/2007 Hoffman et al.
7,286,108 B2 10/2007 Tsuda et al.
7,297,977 B2 11/2007 Hoffman et al.
7,321,353 B2 1/2008 Tsuda et al.
7,323,356 B2 1/2008 Hosono et al.
7,362,295 B2 4/2008 Park et al.
7,385,224 B2 6/2008 Ishii et al.
7,402,506 B2 7/2008 Levy et al.
7,411,209 B2 8/2008 Endo et al.
7,453,065 B2 11/2008 Saito et al.
7,453,087 B2 11/2008 Iwasaki
7,462,862 B2 12/2008 Hoffman et al.
7,468,304 B2 12/2008 Kaji et al.
7,501,293 B2 3/2009 Ito et al.
7,674,650 B2 3/2010 Akimoto et al.
7,714,497 B2 5/2010 Haga et al.
7,732,819 B2 6/2010 Akimoto et al.
7,733,441 B2 6/2010 Seo et al.
7,947,897 B2 5/2011 Rand et al.
7,977,675 B2 7/2011 Kawamura et al.
7,982,130 B2 7/2011 Forrest et al.
7,998,372 B2 8/2011 Yano et al.
8,013,240 B2 9/2011 Forrest et al.
8,017,863 B2 9/2011 Forrest et al.
8,293,595 B2 10/2012 Yamazaki et al.
8,299,456 B2 10/2012 Seo et al.
8,373,191 B2 2/2013 Ide et al.
8,432,502 B2 4/2013 Yamazaki et al.
8,530,246 B2 9/2013 Ofuji et al.
8,531,618 B2 9/2013 Koyama et al.
8,582,058 B2 11/2013 Seo et al.
8,710,495 B2 4/2014 Seo et al.
8,723,781 B2 5/2014 Fukutome et al.
8,766,906 B2 7/2014 Yoshida et al.
8,841,710 B2 9/2014 Yamazaki et al.
8,847,479 B2 9/2014 Seo et al.
8,854,286 B2 10/2014 Yamazaki et al.
9,099,668 B2 8/2015 Seo et al.
9,355,602 B2 5/2016 Yoshida et al.
9,412,798 B2 8/2016 Yamazaki et al.
9,570,017 B2 2/2017 Yoshida et al.
9,859,441 B2 1/2018 Yamazaki et al.
2001/0046027 A1 11/2001 Tai et al.
2002/0056838 A1 5/2002 Ogawa
2002/0132454 A1 9/2002 Ohtsu et al.
2003/0189401 A1 10/2003 Kido et al.
2003/0218222 A1 11/2003 Wager, III et al.
2004/0038446 A1 2/2004 Takeda et al.
2004/0127038 A1 7/2004 Carcia et al.
2005/0017302 A1 1/2005 Hoffman
2005/0199959 A1 9/2005 Chiang et al.
2005/0212737 A1 9/2005 Yoshihara et al.
2006/0035452 A1 2/2006 Carcia et al.
2006/0043377 A1 3/2006 Hoffman et al.
2006/0091793 A1 5/2006 Baude et al.
2006/0108529 A1 5/2006 Saito et al.
2006/0108636 A1 5/2006 Sano et al.
2006/0110867 A1 5/2006 Yabuta et al.
2006/0113536 A1 6/2006 Kumomi et al.
2006/0113539 A1 6/2006 Sano et al.
2006/0113549 A1 6/2006 Den et al.
2006/0113565 A1 6/2006 Abe et al.
2006/0169973 A1 8/2006 Isa et al.
2006/0170111 A1 8/2006 Isa et al.
2006/0197092 A1 9/2006 Hoffman et al.
2006/0208977 A1 9/2006 Kimura
2006/0228974 A1 10/2006 Thelss et al.
2006/0231882 A1 10/2006 Kim et al.
2006/0238135 A1 10/2006 Kimura
2006/0244107 A1 11/2006 Sugihara et al.
2006/0284171 A1 12/2006 Levy et al.
2006/0284172 A1 12/2006 Ishii
2006/0289882 A1 12/2006 Nishimura et al.
2006/0292777 A1 12/2006 Dunbar
2007/0024187 A1 2/2007 Shin et al.
2007/0046191 A1 3/2007 Saito
2007/0052025 A1 3/2007 Yabuta
2007/0054507 A1 3/2007 Kaji et al.
2007/0090365 A1 4/2007 Hayashi et al.
2007/0108446 A1 5/2007 Akimoto
2007/0152217 A1 7/2007 Lai et al.
2007/0172591 A1 7/2007 Seo et al.
2007/0187678 A1 8/2007 Hirao et al.
2007/0187760 A1 8/2007 Furuta et al.
2007/0194379 A1 8/2007 Hosono et al.
2007/0252924 A1 11/2007 Haga et al.
2007/0252928 A1 11/2007 Ito et al.
2007/0272922 A1 11/2007 Kim et al.
2007/0287296 A1 12/2007 Chang
2008/0006877 A1 1/2008 Mardilovich et al.
2008/0038882 A1 2/2008 Takechi et al.
2008/0038929 A1 2/2008 Chang
2008/0050595 A1 2/2008 Nakagawara et al.
2008/0055218 A1 3/2008 Tsuda et al.
2008/0073653 A1 3/2008 Iwasaki
2008/0083950 A1 4/2008 Pan et al.
2008/0106191 A1 5/2008 Kawase
2008/0128689 A1 6/2008 Lee et al.
2008/0129195 A1 6/2008 Ishizaki et al.
2008/0166834 A1 7/2008 Kim et al.
2008/0180385 A1 * 7/2008 Yoshida .................. G09G 3/20 345/102
2008/0182358 A1 7/2008 Cowdery-Corvan et al.
2008/0198107 A1 8/2008 Park et al.
2008/0224133 A1 9/2008 Park et al.
2008/0246713 A1 10/2008 Lee et al.
2008/0254569 A1 10/2008 Hoffman et al.
2008/0258139 A1 10/2008 Ito et al.
2008/0258140 A1 10/2008 Lee et al.
2008/0258141 A1 10/2008 Park et al.
2008/0258143 A1 10/2008 Kim et al.
2008/0296568 A1 12/2008 Ryu et al.
2009/0045397 A1 2/2009 Iwasaki
2009/0068773 A1 3/2009 Lai et al.
2009/0073325 A1 3/2009 Kuwabara et al.
2009/0114910 A1 5/2009 Chang
2009/0134399 A1 5/2009 Sakakura et al.
2009/0152506 A1 6/2009 Umeda et al.
2009/0152541 A1 6/2009 Maekawa et al.
2009/0278122 A1 11/2009 Hosono et al.
2009/0280600 A1 11/2009 Hosono et al.
2010/0065844 A1 3/2010 Tokunaga
2010/0092800 A1 4/2010 Itagaki et al.
2010/0109002 A1 5/2010 Itagaki et al.
2011/0090183 A1 4/2011 Yamazaki et al.
2011/0090204 A1 4/2011 Yamazaki et al.
2011/0102696 A1 5/2011 Yamazaki et al.
2011/0115839 A1 5/2011 Takahashi et al.
2011/0127561 A1 6/2011 Ide et al.
2011/0148846 A1 6/2011 Arasawa et al.
2011/0175874 A1 7/2011 Wakimoto et al.
2011/0175895 A1 7/2011 Hayakawa et al.
2011/0199404 A1 8/2011 Umezaki et al.

(56) References Cited

U.S. PATENT DOCUMENTS

| | | | |
|---|---|---|---|
| 2013/0153032 | A1 | 6/2013 | Forrest et al. |
| 2014/0210808 | A1 | 7/2014 | Arasawa et al. |

FOREIGN PATENT DOCUMENTS

| | | | |
|---|---|---|---|
| EP | 1737044 | A | 12/2006 |
| EP | 1813978 | A | 8/2007 |
| EP | 1930865 | A | 6/2008 |
| EP | 2226847 | A | 9/2010 |
| EP | 2309824 | A | 4/2011 |
| EP | 2378583 | A | 10/2011 |
| JP | 60-198861 | A | 10/1985 |
| JP | 63-210022 | A | 8/1988 |
| JP | 63-210023 | A | 8/1988 |
| JP | 63-210024 | A | 8/1988 |
| JP | 63-215519 | A | 9/1988 |
| JP | 63-239117 | A | 10/1988 |
| JP | 63-265818 | A | 11/1988 |
| JP | 02-108380 | A | 4/1990 |
| JP | 05-251705 | A | 9/1993 |
| JP | 08-264794 | A | 10/1996 |
| JP | 11-505377 | | 5/1999 |
| JP | 11-295717 | A | 10/1999 |
| JP | 2000-044236 | A | 2/2000 |
| JP | 2000-150900 | A | 5/2000 |
| JP | 2001-312253 | A | 11/2001 |
| JP | 2002-076356 | A | 3/2002 |
| JP | 2002-289859 | A | 10/2002 |
| JP | 2003-086000 | A | 3/2003 |
| JP | 2003-086808 | A | 3/2003 |
| JP | 2003-195303 | A | 7/2003 |
| JP | 2004-103957 | A | 4/2004 |
| JP | 2004-272270 | A | 9/2004 |
| JP | 2004-273614 | A | 9/2004 |
| JP | 2004-273732 | A | 9/2004 |
| JP | 2006-019251 | A | 1/2006 |
| JP | 2006-084758 | A | 3/2006 |
| JP | 2006-210845 | A | 8/2006 |
| JP | 2007-010902 | A | 1/2007 |
| JP | 2007-142195 | A | 6/2007 |
| JP | 2008-139797 | A | 6/2008 |
| JP | 2008-218396 | A | 9/2008 |
| JP | 2009-139939 | A | 6/2009 |
| JP | 2009-223188 | A | 10/2009 |
| JP | 2009-260002 | A | 11/2009 |
| JP | 2009-277702 | A | 11/2009 |
| JP | 2010-026334 | A | 2/2010 |
| JP | 2010-056077 | A | 3/2010 |
| JP | 2010-056546 | A | 3/2010 |
| JP | 2010-080436 | A | 4/2010 |
| KR | 2004-0080230 | A | 9/2004 |
| KR | 2006-0048920 | A | 5/2006 |
| KR | 2011-0043722 | A | 4/2011 |
| TW | 200632464 | | 9/2006 |
| WO | WO-2004/114391 | | 12/2004 |
| WO | WO-2007/055931 | | 5/2007 |
| WO | WO-2008/066910 | | 6/2008 |
| WO | WO-2009/063797 | | 5/2009 |
| WO | WO-2009/139482 | | 11/2009 |
| WO | WO-2010/013673 | | 2/2010 |
| WO | WO-2010/036397 | | 4/2010 |
| WO | WO-2010/036398 | | 4/2010 |

OTHER PUBLICATIONS

Fortunato.E et al., "Wide-Bandgap High-Mobility ZnO Thin-Film Transistors Produced at Room Temperature", Appl. Phys. Lett. (Applied Physics Letters) , Sep. 27, 2004, vol. 85, No. 13, pp. 2541-2543.

Dembo.H et al., "RFCPUS on Glass and Plastic Substrates Fabricated by TFT Transfer Technology", IEDM 05: Technical Digest of International Electron Devices Meeting, Dec. 5, 2005, pp. 1067-1069.

Ikeda.T et al., "Full-Functional System Liquid Crystal Display Using Cg-Silicon Technology", SID Digest '04 : SID International Symposium Digest of Technical Papers, 2004, vol. 35, pp. 860-863.

Nomura.K et al., "Room-Temperature Fabrication of Transparent Flexible Thin-Film Transistors Using Amorphous Oxide Semiconductors", Nature, Nov. 25, 2004, vol. 432, pp. 488-492.

Park.J et al., "Improvements in the Device Characteristics of Amorphous Indium Gallium Zinc Oxide Thin-Film Transistors by Ar Plasma Treatment", Appl. Phys. Lett. (Applied Physics Letters), Jun. 26, 2007, vol. 90, No. 26, pp. 262106-1-262106-3.

Takahashi.M et al., "Theoretical Analysis of IGZO Transparent Amorphous Oxide Semiconductor", IDW '08 : Proceedings of the 15th International Display Workshops, Dec. 3, 2008, pp. 1637-1640.

Hayashi.R et al., "42.1: Invited Paper: Improved Amorphous In—Ga—Zn—O TFTs", SID Digest '08 : SID International Symposium Digest of Technical Papers, May 20, 2008, vol. 39, pp. 621-624.

Prins.M et al., "A Ferroelectric Transparent Thin-Film Transistor", Appl. Phys. Lett. (Applied Physics Letters) , Jun. 17, 1996, vol. 68, No. 25, pp. 3650-3652.

Nakamura.M et al., "The phase relations in the In2O3—Ga2ZnO4—ZnO system at 1350° C", Journal of Solid State Chemistry, Aug. 1, 1991, vol. 93, No. 2, pp. 298-315.

Kimizuka.N et al., "Syntheses and Single-Crystal Data of Homologous Compounds, In2O3(ZnO)m (m=3, 4, and 5), InGaO3(ZnO)3, and Ga2O3(ZnO)m (m=7, 8, 9, and 16) in the In2O3—ZnGa2O4—ZnO System", Journal of Solid State Chemistry, Apr. 1, 1995, vol. 116, No. 1, pp. 170-178.

Nomura.K et al., "Thin-Film Transistor Fabricated in Single-Crystalline Transparent Oxide Semiconductor", Science, May 23, 2003, vol. 300, No. 5623, pp. 1269-1272.

Masuda.S et al., "Transparent thin film transistors using ZnO as an active channel layer and their electrical properties", J. Appl. Phys. (Journal of Applied Physics) , Feb. 1, 2003, vol. 93, No. 3, pp. 1624-1630.

Asakuma.N et al., "Crystallization and Reduction of Sol-Gel-Derived Zinc Oxide Films by Irradiation with Ultraviolet Lamp", Journal of Sol-Gel Science and Technology, 2003, vol. 26, pp. 181-184.

Osada.T et al., "15.2: Development of Driver-Integrated Panel using Amorphous In—Ga—Zn-Oxide TFT", SID Digest '09 : SID International Symposium Digest of Technical Papers, May 31, 2009, pp. 184-187.

Nomura.K et al., "Carrier transport in transparent oxide semiconductor with intrinsic structural randomness probed using single-crystalline InGaO3(ZnO)5 films", Appl. Phys. Lett. (Applied Physics Letters) , Sep. 13, 2004, vol. 85, No. 11, pp. 1993-1995.

Li.C et al., "Modulated Structures of Homologous Compounds InMO3(ZnO)m (M=In,Ga; m=Integer) Described by Four-Dimensional Superspace Group", Journal of Solid State Chemistry, 1998, vol. 139, pp. 347-355.

Son.K et al., "42.4L: Late-News Paper: 4 Inch QVGA AMOLED Driven by the Threshold Voltage Controlled Amorphous GIZO (Ga2O3—In2O3—ZnO) TFT", SID Digest '08 : SID International Symposium Digest of Technical Papers, May 20, 2008, vol. 39, pp. 633-636.

Lee.J et al., "World's Largest (15-Inch) XGA AMLCD Panel Using IGZO Oxide TFT", SID Digest '08 : SID International Symposium Digest of Technical Papers, May 20, 2008, vol. 39, pp. 625-628.

Nowatari.H et al., "60.2: Intermediate Connector With Suppressed Voltage Loss for White Tandem OLEDs", SID Digest '09 : SID International Symposium Digest of Technical Papers, May 31, 2009, vol. 40, pp. 899-902.

Kanno.H et al., "White Stacked Electrophosphorecent Organic Light-Emitting Devices Employing MOO3 as a Charge-Generation Layer", Adv. Mater. (Advanced Materials), 2006, vol. 18, No. 3, pp. 339-342.

Tsuda.K et al., "Ultra Low Power Consumption Technologies for Mobile TFT-LCDs ", IDW '02 : Proceedings of the 9th International Display Workshops, Dec. 4, 2002, pp. 295-298.

Van de Walle.C, "Hydrogen as a Cause of Doping in Zinc Oxide", Phys. Rev. Lett. (Physical Review Letters), Jul. 31, 2000, vol. 85, No. 5, pp. 1012-1015.

(56) References Cited

OTHER PUBLICATIONS

Fung.T et al., "2-D Numerical Simulation of High Performance Amorphous In—Ga—Zn—O TFTs for Flat Panel Displays", AM-FPD '08 Digest of Technical Papers, Jul. 2, 2008, pp. 251-252, The Japan Society of Applied Physics.
Jeong.J et al., "3.1: Distinguished Paper: 12.1-Inch WXGA AMOLED Display Driven by Indium-Gallium-Zinc Oxide TFTs Array", SID Digest '08 : SID International Symposium Digest of Technical Papers, May 20, 2008, vol. 39, No. 1, pp. 1-4.
Park.J et al., "High performance amorphous oxide thin film transistors with self-aligned top-gate structure", IEDM 09: Technical Digest of International Electron Devices Meeting, Dec. 7, 2009, pp. 191-194.
Kurokawa.Y et al., "UHF RFCPUS on Flexible and Glass Substrates for Secure RFID Systems", Journal of Solid-State Circuits , 2008, vol. 43, No. 1, pp. 292-299.
Ohara.H et al., "Amorphous In—Ga—Zn-Oxide TFTs with Suppressed Variation for 4.0 inch QVGA AMOLED Display", AM-FPD '09 Digest of Technical Papers, Jul. 1, 2009, pp. 227-230, The Japan Society of Applied Physics.
Coates.D et al., "Optical Studies of the Amorphous Liquid-Cholesteric Liquid Crystal Transition:The "Blue Phase"", Physics Letters, Sep. 10, 1973, vol. 45A, No. 2, pp. 115-116.
Cho.D et al., "21.2:Al and Sn-Doped Zinc Indium Oxide Thin Film Transistors for AMOLED Back-plane", SID Digest '09 : SID International Symposium Digest of Technical Papers, May 31, 2009, pp. 280-283.
Lee.M et al., "15.4:Excellent Performance of Indium-Oxide-Based Thin-Film Transistors by DC Sputtering", SID Digest '09 : SID International Symposium Digest of Technical Papers, May 31, 2009, pp. 191-193.
Jin.D et al., "65.2:Distinguished Paper:World-Largest (6.5") Flexible Full Color Top Emission AMOLED Display on Plastic Film and Its Bending Properties", SID Digest '09 : SID International Symposium Digest of Technical Papers, May 31, 2009, pp. 983-985.
Sakata.J et al., "Development of 4.0-In. AMOLED Display With Driver Circuit Using Amorphous In—Ga—Zn-Oxide TFTs", IDW '09 : Proceedings of the 16th International Display Workshops, 2009, pp. 689-692.
Park.J et al., "Amorphous Indium-Gallium-Zinc Oxide TFTs and Their Application for Large Size AMOLED", AM-FPD '08 Digest of Technical Papers, Jul. 2, 2008, pp. 275-278.
Park.S et al., "Challenge to Future Displays: Transparent AM-OLED Driven by Peald Grown ZnO TFT", IMID '07 Digest, 2007, pp. 1249-1252.
Godo.H et al., "Temperature Dependence of Characteristics and Electronic Structure for Amorphous In—Ga—Zn-Oxide TFT", AM-FPD '09 Digest of Technical Papers, Jul. 1, 2009, pp. 41-44.
Osada.T et al., "Development of Driver-Integrated Panel Using Amorphous In—Ga—Zn-Oxide TFT", AM-FPD '09 Digest of Technical Papers, Jul. 1, 2009, pp. 33-36.
Hirao.T et al., "Novel Top-Gate Zinc Oxide Thin-Film Transistors (ZnO TFTs) for AMLCDs", J. Soc. Inf. Display (Journal of The Society for Information Display), 2007, vol. 15, No. 1, pp. 17-22.
Hosono.H, "68.3:Invited Paper:Transparent Amorphous Oxide Semiconductors for High Performance TFT", SID Digest '07 : SID International Symposium Digest of Technical Papers, 2007, vol. 38, pp. 1830-1833.
Godo.H et al., "P-9:Numerical Analysis on Temperature Dependence of Characteristics of Amorphous In—Ga—Zn-Oxide TFT", SID Digest '09 : SID International Symposium Digest of Technical Papers, May 31, 2009, pp. 1110-1112.
Ohara.H et al., "21.3:4.0 In. QVGA AMOLED Display Using In—Ga—Zn-Oxide TFTs With a Novel Passivation Layer", SID Digest '09 : SID International Symposium Digest of Technical Papers, May 31, 2009, pp. 284-287.
Miyasaka.M, "Suftla Flexible Microelectronics on Their Way to Business", SID Digest '07 : SID International Symposium Digest of Technical Papers, 2007, vol. 38, pp. 1673-1676.
Chern.H et al., "An Analytical Model for the Above-Threshold Characteristics of Polysilicon Thin-Film Transistors", IEEE Transactions on Electron Devices, Jul. 1, 1995, vol. 42, No. 7, pp. 1240-1246.
Kikuchi.H et al., "39.1:Invited Paper:Optically Isotropic Nano-Structured Liquid Crystal Composites for Display Applications", SID Digest '09 : SID International Symposium Digest of Technical Papers, May 31, 2009, pp. 578-581.
Asaoka.Y et al., "29.1:Polarizer-Free Reflective LCD Combined With Ultra Low-Power Driving Technology", SID Digest '09 : SID International Symposium Digest of Technical Papers, May 31, 2009, pp. 395-398.
Lee.H et al., "Current Status of, Challenges to, and Perspective View of AM-OLED ", IDW '06 : Proceedings of the 13th International Display Workshops, Dec. 7, 2006, pp. 663-666.
Kikuchi.H et al., "62.2:Invited Paper:Fast Electro-Optical Switching in Polymer-Stabilized Liquid Crystalline Blue Phase for Display Application", SID Digest '07 : SID International Symposium Digest of Technical Papers, 2007, vol. 38, pp. 1737-1740.
Nakamura.M, "Synthesis of Homologous Compound with New Long-Period Structure", NIRIM Newsletter, Mar. 1, 1995, vol. 150, pp. 1-4.
Kikuchi.H et al., "Polymer-Stabilized Liquid Crystal Blue Phases", Nature Materials, Sep. 2, 2002, vol. 1, pp. 64-68.
Kimizuka.N et al., "Spinel,YBFE2O4, and YB2FE3O7 Types of Structures for Compounds in the In2O3 and Sc2O3—A2O3—BO Systems [A; Fe, Ga, or Al; B: Mg, Mn, Fe, Ni, Cu or Zn] at Temperatures over 1000° C.", Journal of Solid State Chemistry, 1985, vol. 60, pp. 382-384.
Kitzerow.H et al., "Observation of Blue Phases in Chiral Networks", Liquid Crystals, 1993, vol. 14, No. 3, pp. 911-916.
Costello.M et al., "Electron Microscopy of a Cholesteric Liquid Crystal and Its Blue Phase", Phys. Rev. A (Physical Review. A), May 1, 1984, vol. 29, No. 5, pp. 2957-2959.
Meiboom.S et al., "Theory of the Blue Phase of Cholesteric Liquid Crystals", Phys. Rev. Lett. (Physical Review Letters), May 4, 1981, vol. 46, No. 18, pp. 1216-1219.
Park.Sang-Hee et al., "42.3: Transparent ZnO Thin Film Transistor for the Application of High Aperture Ratio Bottom Emission AM-OLED Display", SID Digest '08 : SID International Symposium Digest of Technical Papers, May 20, 2008, vol. 39, pp. 629-632.
Orita.M et al., "Mechanism of Electrical Conductivity of Transparent InGaZnO4", Phys. Rev. B (Physical Review. B), Jan. 15, 2000, vol. 61, No. 3, pp. 1811-1816.
Nomura.K et al., "Amorphous Oxide Semiconductors for High-Performance Flexible Thin-Film Transistors", Jpn. J. Appl. Phys. (Japanese Journal of Applied Physics) , 2006, vol. 45, No. 5B, pp. 4303-4308.
Janotti.A et al., "Native Point Defects in ZnO", Phys. Rev: B (Physical Review. B), Oct. 4, 2007, vol. 76, No. 16, pp. 165202-1-165202-22.
Park.J et al., "Electronic Transport Properties of Amorphous Indium-Gallium-Zinc Oxide Semiconductor Upon Exposure to Water", Appl. Phys. Lett. (Applied Physics Letters) , 2008, vol. 92, pp. 072104-1-072104-3.
Hsieh.H et al., "P-29:Modeling of Amorphous Oxide Semiconductor Thin Film Transistors and Subgap Density of States", SID Digest '08 : SID International Symposium Digest of Technical Papers, May 20, 2008, vol. 39, pp. 1277-1280.
Janotti.A et al., "Oxygen Vacancies in ZnO", Appl. Phys. Lett. (Applied Physics Letters) , 2005, vol. 87, pp. 122102-1-122102-3.
Oba.F et al., "Defect energetics in ZnO: A hybrid Hartree-Fock density functional study", Phys. Rev. B (Physical Review. B), 2008, vol. 77, pp. 245202-1-245202-6.
Orita.M et al., "Amorphous transparent conductive oxide InGaO3(ZnO)m (m<4):a Zn4s conductor", Philosophical Magazine, 2001, vol. 81, No. 5, pp. 501-515.
Hosono.H et al., "Working hypothesis to explore novel wide band gap electrically conducting amorphous oxides and examples", J. Non-Cryst. Solids (Journal of Non-Crystalline Solids), 1996, vol. 198-200, pp. 165-169.

(56) References Cited

OTHER PUBLICATIONS

Mo.Y et al., "Amorphous Oxide TFT Backplanes for Large Size AMOLED Displays", IDW '08 : Proceedings of the 6th International Display Workshops, Dec. 3, 2008, pp. 581-584.
Kim.S et al., "High-Performance oxide thin film transistors passivated by various gas plasmas", 214th ECS Meeting, 2008, No. 2317, ECS.
Clark.S et al., "First Principles Methods Using CASTEP", Zeitschrift fur Kristallographie, 2005, vol. 220, pp. 567-570.
Lany.S et al., "Dopability, Intrinsic Conductivity, and Nonstoichiometry of Transparent Conducting Oxides", Phys. Rev. Lett. (Physical Review Letters), Jan. 26, 2007, vol. 98, pp. 045501-1-045501-4.
Park.J et al., "Dry etching of ZnO films and plasma-induced damage to optical properties", J. Vac. Sci. Technol. B (Journal of Vacuum Science & Technology B), Mar. 1, 2003, vol. 21, No. 2, pp. 800-803.
Oh.M et al., "Improving the Gate Stability of ZnO Thin-Film Transistors With Aluminum Oxide Dielectric Layers", J. Electrochem. Soc. (Journal of The Electrochemical Society), 2008, vol. 155, No. 12, pp. H1009-H1014.
Ueno.K et al., "Field-Effect Transistor on SrTiO3 With Sputtered Al2O3 Gate Insulator", Appl. Phys. Lett. (Applied Physics Letters), Sep. 1, 2003, vol. 83, No. 9, pp. 1755-1757.
Taiwanese Office Action (Application No. 100114440) dated Oct. 26, 2015.

* cited by examiner

LIQUID CRYSTAL DISPLAY DEVICE AND ELECTRONIC DEVICE

BACKGROUND OF THE INVENTION

1. Field of the Invention

The present invention relates to liquid crystal display devices. In particular, the present invention relates to a transmissive liquid crystal display device.

2. Description of the Related Art

Liquid crystal display devices are devices performing display by modulation of light with the use of liquid crystal materials whose alignment is controlled in accordance with applied voltage. Specifically, the liquid crystal display devices are roughly divided into two, depending on light used for display: external light such as natural light or interior lighting, or light emitted from light sources (backlights) included in the liquid crystal display devices itself. In general, the liquid crystal display devices which perform display with the use of the former are referred to as reflective liquid crystal display devices, and the liquid crystal display devices which perform display with the use of the latter are referred to as transmissive liquid crystal display devices. Note that the transmissive liquid crystal display devices can widely be used as devices in comparison with the reflective liquid crystal display device because the display quality varies depending on external environment (intensity of external light).

In general, transmissive liquid crystal display devices have display panels including a plurality of pixels arranged in matrix and backlights delivering white light to the display panels. Further, the pixel includes a transistor for controlling an input of an image signal, a liquid crystal element to which voltage corresponding to the image signal is applied, a color filter that transmits only light with a wavelength of a given color (e.g., red (R), green (G), or blue (B)). Note that the liquid crystal element includes a pair of electrodes and a liquid crystal material provided between the pair of electrodes. In addition, the transmittance of white light is controlled for each pixel and only light with a wavelength of a given color is transmitted by a color filter, so that display of each pixel is determined. Therefore, an image is displayed on the display panel included in the liquid crystal display device.

In recent years, there has been a growing interest in global environment, and the development of liquid crystal display devices consuming less power has attracted attention. For example, Patent Document 1 discloses a technique by which power consumption of a liquid crystal display device is reduced. Specifically, Patent Document 1 discloses a liquid crystal display device in which all data signal lines are electrically separated from a data signal driver to be in an indefinite state (also referred to as a floating state) during an idle period in which all scan lines and data signal lines are in a non-selected state.

REFERENCE

Patent Document 1: Japanese Published Patent Application No. 2001-312253

SUMMARY OF THE INVENTION

In the liquid crystal display device disclosed in Patent Document 1, an image signal is not input to any of pixels in the inactive period. That is, a period is extended in which a transistor for controlling an input of an image signal is kept off with an image signal held in each pixel. Thus, adversary effect on display of a pixel caused by off-state current of the transistor becomes apparent. Specifically, voltage applied to a liquid crystal element is reduced, whereby display degradation (variation) of a pixel including the liquid crystal element becomes apparent.

A transmissive liquid crystal display device includes a display panel and a backlight adjacent to the display panel. The backlight involves heating at the time of light emission; accordingly, operation temperature of a transistor provided for the display panel is increased in accordance with light emission of the backlight. Note that the off-state current of the transistor is increased in accordance with an increase in the operation temperature. Therefore, there is a strong trade-off between power consumption and display quality in the case where a transmissive liquid crystal display device is used for the liquid crystal display device disclosed in Patent Document 1.

It is an object of an embodiment of the present invention to provide a transmissive liquid crystal display device in which power consumption is reduced and deterioration in display quality is suppressed.

It is a main point of an embodiment of the present invention to apply a light source for surface (planar) emission to a backlight of a transmissive liquid crystal display device which can control the frequency of inputting an image signal to a pixel.

Specifically, an embodiment of the present invention is a liquid crystal display device including a display panel including a pixel portion in which pixels each of which includes a transistor configured to control an input of an image signal, a liquid crystal element configured to be supplied with voltage in accordance with the image signal, and a color filter configured to transmit light with a wavelength range of red, green, or blue, and configured to absorb the other light in the visible light range are arranged in matrix; a backlight configured to emit white light toward the pixel portion; and a control circuit configured to control frequency of inputting an image signal to the pixel. In addition, the backlight performs surface light emission.

Note that the surface-emission light source is a light source which performs surface light emission. For example, as the light source, a light source emitting light with the use of organic electroluminescence (organic EL) can be given. In addition, the light source is not a light source in which light emission from a dot light source or a line light source is optically processed to obtain planar light emission. That is, the light source is not a light source in which light emitted from an LED or a cold cathode fluorescent lamp is processed to obtain planar light emission with the use of a light guide plate, a diffusion plate, a prism plate, or the like.

A liquid crystal display device of an embodiment of the present invention applies a light source for surface emission to a backlight. The light source has a large light emission area because it is a light source which performs surface light emission. Therefore, the backlight can effectively radiate heat. That means the backlight is a backlight whose temperature increase in light emission is suppressed. Accordingly, in the liquid crystal display device, an increase in operation temperature of the transistor provided in each pixel can be suppressed. Therefore, an increase in off-state current of the transistor in the liquid crystal display device can be suppressed.

As described above, a liquid crystal display device of an embodiment of the present invention applies a light source which is excellent in heat radiation to a backlight. Thus, even in the case where an image signal is not input to a pixel for a long period, the pixel can hold an image signal. In other words, both a reduction in power consumption and a suppression of deterioration in display quality can be realized.

BRIEF DESCRIPTION OF THE DRAWINGS

The patent or application file contains at least one drawing executed in color. Copies of this patent or patent application publication with the color drawings will be provided by the Office upon request and payment of the necessary fee.

DETAILED DESCRIPTION OF THE INVENTION

Hereinafter, embodiments of the present invention will be described in detail with reference to the accompanying drawings. Note that the present invention is not limited to the description below, and it is easily understood by those skilled in the art that a variety of changes and modifications can be made without departing from the spirit and scope of the present invention. Therefore, the present invention should not be limited to the descriptions of the embodiment below.

First, an example of a transmissive liquid crystal display device will be described with reference to FIGS. 1A to 1C, FIG. 2, FIG. 3, FIG. 4, FIG. 5, FIG. 6, FIG. 7, FIG. 8, FIG. 9, FIG. 10, and FIG. 11.

<Structural Example of Liquid Crystal Display Device>

Figure 1A:
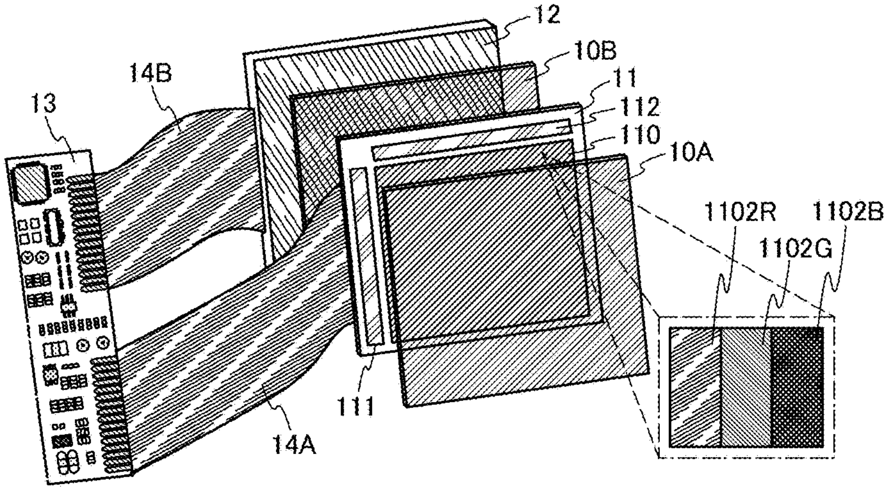
FIG. 1A illustrates a structural example of a liquid crystal display device.

FIG. 1A is a perspective view of a structural example of a transmissive liquid crystal display device. The liquid crystal display device in FIG. 1A includes a display panel 11 provided between a polarizing plate 10A and a polarizing plate 10B, a backlight 12 provided adjacent to the display panel 11, and a control circuit 13 controlling the display panel 11 and the backlight 12. Note that the control circuit 13 is electrically connected to the display panel 11 and the backlight 12 through FPCs (flexible printed circuits) 14A and 14B. Further, the display panel 11 includes a pixel portion 110 provided with a plurality of pixels arranged in matrix, and a scan line driver circuit 111 and a signal line driver circuit 112 which control display of the pixel portion 110. Furthermore, each pixel has a color filter transmitting only light with the wavelength of a given color. Here, each of three pixels horizontally arranged in adjacent to each other includes one of a color filter 1102R, a color filter 1102G, and a color filter 1102B, and the color filter different from the color filters included in the other two pixels. The color filter 1102R is a color filter which transmits light with the wavelength range of red (R) (equal to or longer than 600 nm and shorter than 700 nm) and absorbs the other light in the visible light range. The color filter 1102G is a color filter which transmits light with the wavelength range of green (G) (equal to or longer than 500 nm and shorter than 570 nm) and absorbs the other light in the visible light range. The color filter 1102B is a color filter which transmits light with the wavelength range of blue (B) (equal to or longer than 430 nm and shorter than 500 nm) and absorbs the other light in the visible light range.

<Structural Example of Display Panel 11>

Figure 1B:
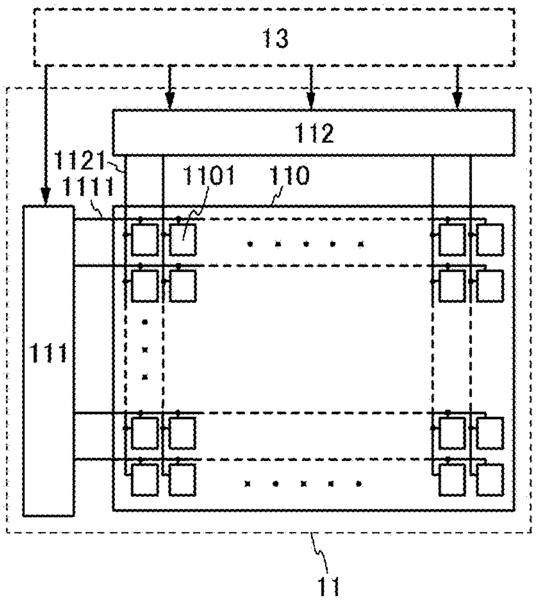
FIG. 1B illustrates a structural example of a display panel.

FIG. 1B illustrates a specific structural example of the display panel 11. The display panel in FIG. 1B includes a pixel portion 110, a scan line driver circuit 111, a signal line driver circuit 112, n scan lines 1111 (n is a natural number greater than or equal to 2), and m signal lines 1121 (m is a natural number greater than or equal to 2). The scan lines 1111 are placed parallel or approximately parallel to each other. The potentials of the scan lines 1111 are controlled by the scan line driver circuit 111. The signal lines 1121 are placed parallel or approximately parallel to each other. The potentials of the signal lines 1121 are controlled by the signal line driver circuit 112. The pixel portion 110 includes a plurality of pixels 1101 arranged in a matrix (of m rows and n columns). Each of the scan lines 1111 is electrically connected to the pixels 1101 arranged in a given row, among the plurality of pixels 1101 arranged in matrix (of m rows and n columns). Each of the scan lines 1111 is electrically connected to m pixels 1101 arranged in a given row, among the plurality of pixels 1101 arranged in matrix (of n rows and m columns) in the pixel portion 1101. Each of the signal lines 1121 is electrically connected to n pixels 1101 arranged in a given column, among the plurality of pixels 1101 arranged in matrix (of n rows and m columns).

To the scan line driver circuit 111, start signals for the scan line driver circuit, a clock signal for the scan line driver circuit, and drive power supplies such as high power supply potentials and a low power supply potential are input from the control circuit 13. To the signal line driver circuit 112, signals such as a start signal for the signal line driver circuit, a clock signal for the signal line driver circuit, and image signals and drive power supplies such as a high power supply potential and a low power supply potential are input from the control circuit 13.

<Structural Example of Pixel 1101>

Figure 1C:
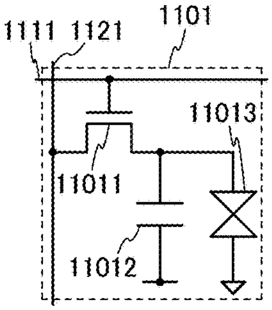
FIG. 1C illustrates a structural example of a pixel.

FIG. 1C illustrates a structural example of a circuit of a pixel 1101. The pixel 1101 in FIG. 1C includes a transistor 11011, a gate of which is electrically connected to the scan line 1111, and one of a source and a drain of which is electrically connected to the signal line 1121; a capacitor 11012, one of electrodes of which is electrically connected to the other of the source and the drain of the transistor 11011, and the other of the electrodes of which is electrically connected to a wiring supplying a capacitor potential; and a liquid crystal element 11013, one of electrodes of which is electrically connected to the other of the source and the drain of the transistor 11011 and the one of the electrodes of the capacitor 11012, and the other of the electrodes of which is electrically connected to a wiring supplying a counter potential.

<Structural Example of Transistor 11011>

Figure 2:
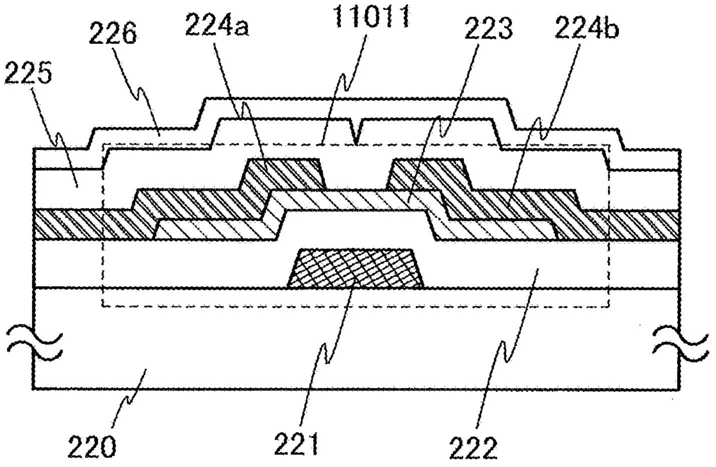
FIG. 2 illustrates a structural example of a transistor.

FIG. 2 is a structural example of the transistor 11011. The transistor 11011 illustrated in FIG. 2 includes a gate layer

221 provided over a substrate 220 having an insulating surface, a gate insulating layer 222 provided over the gate layer 221, an oxide semiconductor layer 223 provided over the gate insulating layer 222, and a source layer 224*a* and a drain layer 224*b* provided over the oxide semiconductor layer 223. Further, in the transistor 11011 illustrated in FIG. 2, an insulating layer 225 covering the transistor the transistor 11011 is formed in contact with the oxide semiconductor layer 223, and a protective insulating layer 226 is formed over the insulating layer 225.

The transistor 11011 in FIG. 2 includes the oxide semiconductor layer 223 as a semiconductor layer. Examples of an oxide semiconductor used for the oxide semiconductor layer 223 are an In—Sn—Ga—Zn—O-based oxide semiconductor which is an oxide of four metal elements; an In—Ga—Zn—O-based oxide semiconductor, an In—Sn—Zn—O-based oxide semiconductor, an In—Al—Zn—O-based oxide semiconductor, a Sn—Ga—Zn—O-based oxide semiconductor, an Al—Ga—Zn—O-based oxide semiconductor, and a Sn—Al—Zn—O-based oxide semiconductor which are oxides of three metal elements; an In—Ga—O-based oxide semiconductor, an In—Zn—O-based oxide semiconductor, a Sn—Zn—O-based oxide semiconductor, an Al—Zn—O-based oxide semiconductor, a Zn—Mg—O-based oxide semiconductor, a Sn—Mg—O-based oxide semiconductor, and an In—Mg—O-based oxide semiconductor which are oxides of two metal elements; and an In—O-based oxide semiconductor, a Sn—O-based oxide semiconductor, and a Zn—O-based oxide semiconductor which are oxides of one metal element. Further, $SiO_2$ may be contained in the above oxide semiconductor. Here, for example, the In—Ga—Zn—O-based oxide semiconductor means an oxide containing at least In, Ga, and Zn, and the composition ratio of the elements is not particularly limited. The In—Ga—Zn—O-based oxide semiconductor may contain an element other than In, Ga, and Zn. As the oxide semiconductor layer 223, a thin film expressed by a chemical formula of $InMO_3(ZnO)_m$ (m>0) can be used. Here, M represents one or more metal elements selected from Zn, Ga, Al, Mn, and Co. For example, M may be Ga, Ga and Al, Ga and Mn, Ga and Co, or the like.

When an In—Zn—O-based material is used as the oxide semiconductor, a target to be used has a composition ratio of In:Zn=50:1 to 1:2 in an atomic ratio ($In_2O_3$:ZnO=25:1 to 1:4 in a molar ratio), preferably In:Zn=20:1 to 1:1 in an atomic ratio ($In_2O_3$:ZnO=10:1 to 1:2 in a molar ratio), more preferably In:Zn=15:1 to 1.5:1 in an atomic ratio ($In_2O_3$:ZnO=15:2 to 3:4 in a molar ratio). For example, in a target used for formation of an In—Zn—O-based oxide semiconductor which has an atomic ratio of In:Zn:O=X:Y:Z, an inequality of Z>1.5X+Y is satisfied.

The above-described oxide semiconductor is an oxide semiconductor which is highly purified and is made to be electrically i-type (intrinsic) as follows: an impurity such as hydrogen, moisture, a hydroxy group, or hydride (also referred to as a hydrogen compound), which is a factor of the variation in electrical characteristics, is intentionally eliminated. Accordingly, the variation in electrical characteristics of the transistor including the oxide semiconductor can be suppressed.

Therefore, it is preferable that the oxide semiconductor contain as little hydrogen as possible. Further, the highly purified oxide semiconductor has very few carriers which are derived from hydrogen, oxygen deficiency, and the like (close to zero) and the carrier density is less than $1\times10^{12}/cm^3$, preferably less than $1\times10^{11}/cm^3$. In other words, the density of carriers derived from hydrogen, oxygen deficiency, and the like in the oxide semiconductor layer is made to be as close to zero as possible. Since the oxide semiconductor layer has very few carriers derived from hydrogen, oxygen vacancy, and the like, the amount of off-state current at the time when the transistor is off can be small. Furthermore, because a small number of impurity states is derived from hydrogen, oxygen vacancy, and the like, it is possible to reduce variation and deterioration in electrical characteristics due to light irradiation, temperature change, application of bias, or the like. Note that the smaller the amount of off-state current is, the better. The transistor using the above oxide semiconductor for a semiconductor layer, has a off-state current value per micrometer of channel width (W) of 100 zA (zeptoampere) or less, preferably 10 zA or less, and more preferably 1 zA or less. Furthermore, because there is few PN junction and little hot carrier degradation, electrical characteristics of the transistor are not adversely affected by these factors.

A transistor having a channel formation region including an oxide semiconductor, which is highly purified by such drastic removal of hydrogen contained in the oxide semiconductor layer, can have an extremely low off-state current. In other words, in circuit design, the oxide semiconductor layer can be regarded as an insulator when the transistor is off. Moreover, when the transistor is on, the current supply capability of the oxide semiconductor layer is expected to be higher than that of a semiconductor layer formed using amorphous silicon.

Note that as the substrate 220, a glass substrate of barium borosilicate glass, aluminoborosilicate glass, or the like can be used, for example.

For the gate layer 221, an element selected from aluminum (Al), copper (Cu), titanium (Ti), tantalum (Ta), tungsten (W), molybdenum (Mo), chromium (Cr), neodymium (Nd), and scandium (Sc); an alloy containing any of these elements; or a nitride containing any of these elements can be used. A stacked structure of these materials can also be used.

For the gate insulating layer 222, an insulator such as silicon oxide, silicon nitride, silicon oxynitride, silicon nitride oxide, aluminum oxide, or tantalum oxide can be used. A stacked structure of these materials can also be used. Note that silicon oxynitride refers to a substance which contains more oxygen than nitrogen and contains oxygen, nitrogen, silicon, and hydrogen at given concentrations ranging from 55 atom % to 65 atom %, 1 atom % to 20 atom %, 25 atom % to 35 atom %, and 0.1 atom % to 10 atom %, respectively, where the total percentage of atoms is 100 atom %. Further, the silicon nitride oxide film refers to a film which contains more nitrogen than oxygen and contains oxygen, nitrogen, silicon, and hydrogen at given concentrations ranging from 15 atom % to 30 atom %, 20 atom % to 35 atom %, 25 atom % to 35 atom %, and 15 atom % to 25 atom %, respectively, where the total percentage of atoms is 100 atom %.

For the source layer 224*a* and the drain layer 224*b*, an element selected from aluminum (Al), copper (Cu), titanium (Ti), tantalum (Ta), tungsten (W), molybdenum (Mo), chromium (Cr), neodymium (Nd), and scandium (Sc); an alloy containing any of these elements; or a nitride containing any of these elements can be used. A stacked structure of these materials can also be used.

A conductive film to be the source layer 224*a* and the drain layer 224*b* (including a wiring layer formed using the same layer as the source and drain layers) may be formed using a conductive metal oxide. As conductive metal oxide, indium oxide ($In_2O_3$), tin oxide ($SnO_2$), zinc oxide (ZnO), indium oxide-tin oxide alloy ($In_2O_3$—$SnO_2$; abbreviated to ITO), indium oxide-zinc oxide alloy ($In_2O_3$—ZnO), or any of these metal oxide materials in which silicon oxide is contained can be used.

For the insulating layer 225, an insulator such as silicon oxide, silicon oxynitride, aluminum oxide, or aluminum oxynitride can be used. A stacked structure of these materials can also be used.

For the protective insulating layer 226, an insulator such as silicon nitride, aluminum nitride, silicon nitride oxide, or aluminum nitride oxide can be used. A stacked structure of these materials can also be used.

A planarization insulating film may be formed over the protective insulating layer 226 in order to reduce surface roughness due to the transistor. For the planarization insulating film, an organic material such as polyimide, acrylic, or benzocyclobutene can be used. Other than such organic materials, it is also possible to use a low-dielectric constant material (a low-k material) or the like. Note that the planarization insulating film may be formed by stacking a plurality of insulating films formed from these materials.

<Off-State Current of Transistor>

Next, described is results of measuring the off-state current of a transistor including a highly-purified oxide semiconductor.

Figure 3:
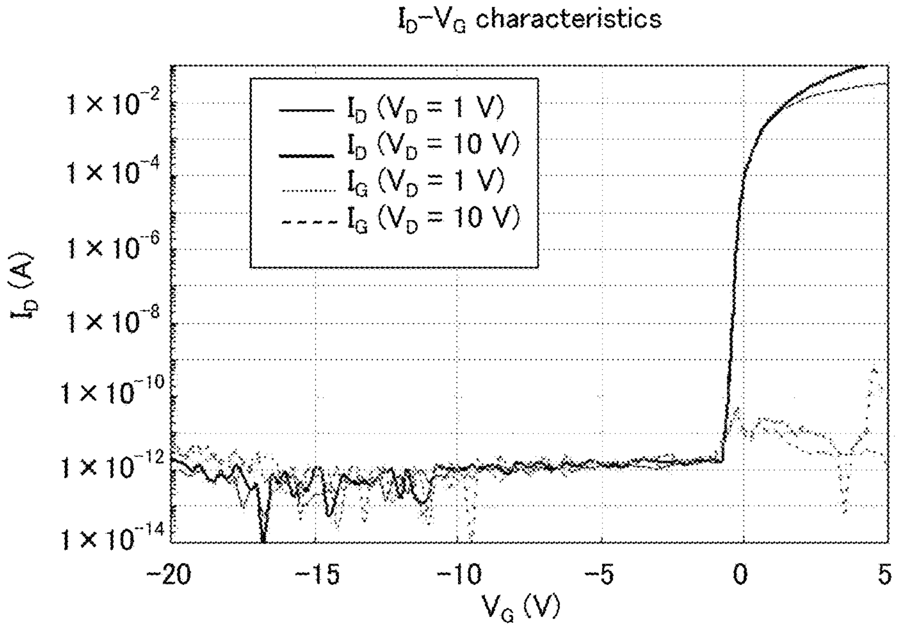
FIG. 3 illustrates characteristics of a transistor.

First, in consideration of the fact that off-state current of a transistor including a highly-purified oxide semiconductor layer is extremely low, the off-state current was measured with the use of a transistor with a sufficiently large channel width W of 1 m. FIG. 3 shows the results of measuring of the off-state current of a transistor with a channel width W of 1 m. In FIG. 3, the horizontal axis shows a gate voltage VG and the vertical axis shows a drain current ID. In the case where the drain voltage VD is +1 V or +10 V and the gate voltage VG is in a range of −5 V to −20 V, the off-state current of the transistor was found to be lower than or equal to $1\times10^{-12}$ A which is the detection limit. Moreover, it was found that the off-state current (here, per channel width of 1 μm) of the transistor was 1 aA/μm ($1\times10^{-18}$ A/μm) or less.

Next the results of measuring the off-state current of the transistor including a highly-purified oxide semiconductor layer more accurately will be described. As described above, the off-state current of the transistor including a highly-purified oxide semiconductor was found to be smaller than or equal to $1\times10^{-12}$ A, which is the detection limit of the measurement equipment. Here, the results obtained measuring more accurate off-state current value (the value smaller than or equal to the detection limit of measurement equipment in the above measurement), with the use of an element for characteristic evaluation, will be described.

First, the element for characteristic evaluation which was used in a method for measuring current will be described with reference to FIG. 4.

Figure 4:
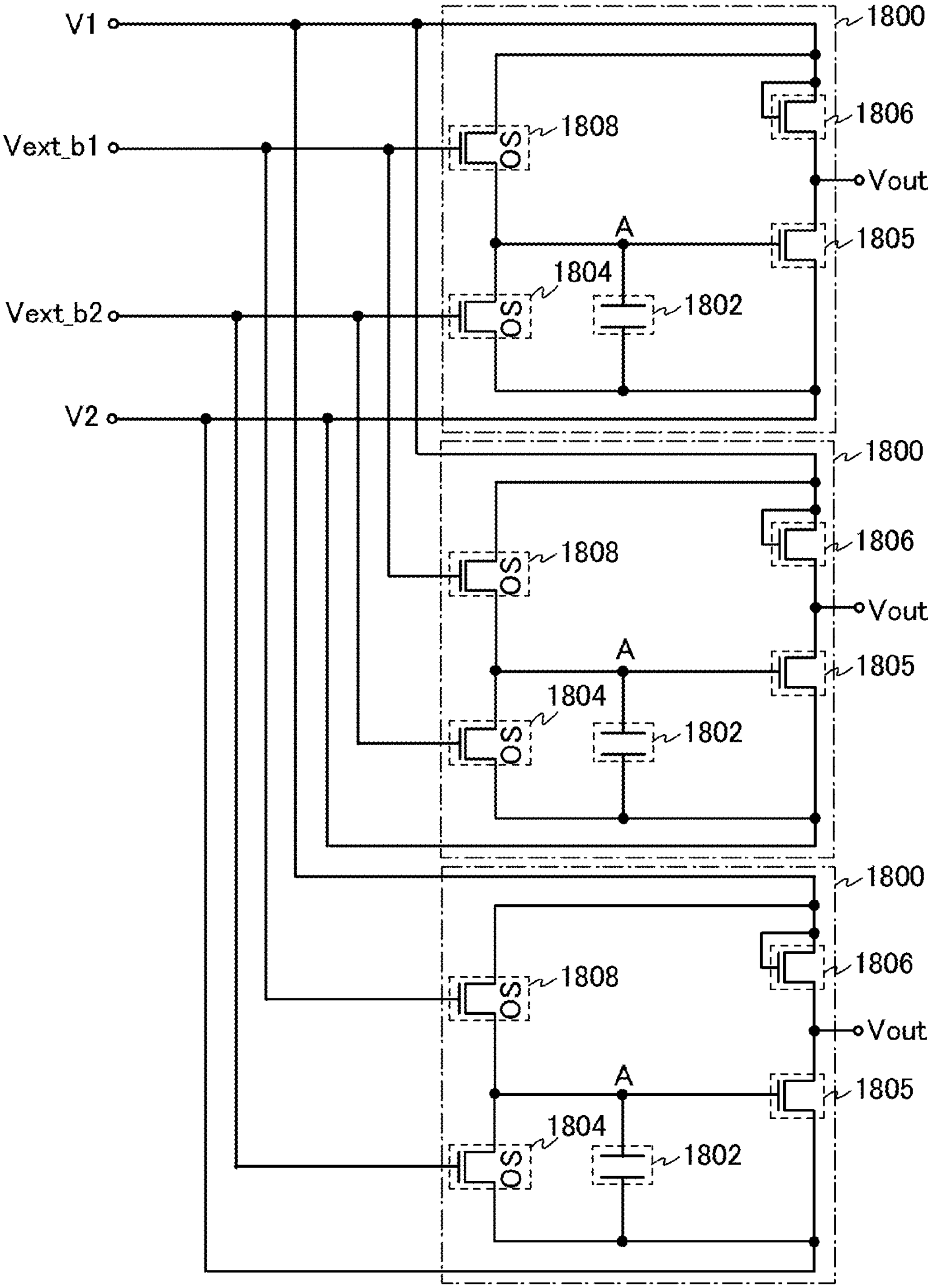
FIG. 4 illustrates a circuit for evaluating characteristics of a transistor.

In the element for characteristic evaluation in FIG. 4, three measurement systems 1800 are connected in parallel. The measurement system 1800 includes a capacitor 1802, a transistor 1804, a transistor 1805, a transistor 1806, and a transistor 1808. The transistor 1804 and 1808 includes a highly-purified oxide semiconductor layer.

In the measurement system 1800, one of a source and a drain of the transistor 1804, one of terminals of the capacitor 1802, and one of a source and a drain of the transistor 1805 are connected to a power source (for supplying a potential V2). The other of the source and the drain of the transistor 1804, one of a source and a drain of the transistor 1808, the other of the terminals of the capacitor 1802, and a gate of the transistor 1805 are electrically connected to each other. The other of the source and the drain of the transistor 1808, one of a source and a drain of the transistor 1806, and a gate of the transistor 1806 are electrically connected to a power source (a power source for supplying a potential V1). The other of the source and the drain of the transistor 1805 and the other of the source and the drain of the transistor 1806 are electrically connected to an output terminal.

A potential Vext_b2 for controlling the on/off state of the transistor 1804 is supplied to a gate of the transistor 1804. A potential Vext_b1 for controlling the on/off state of the transistor 1808 is supplied to a gate of the transistor 1808. A potential Vout is output from the output terminal.

Figure 5:
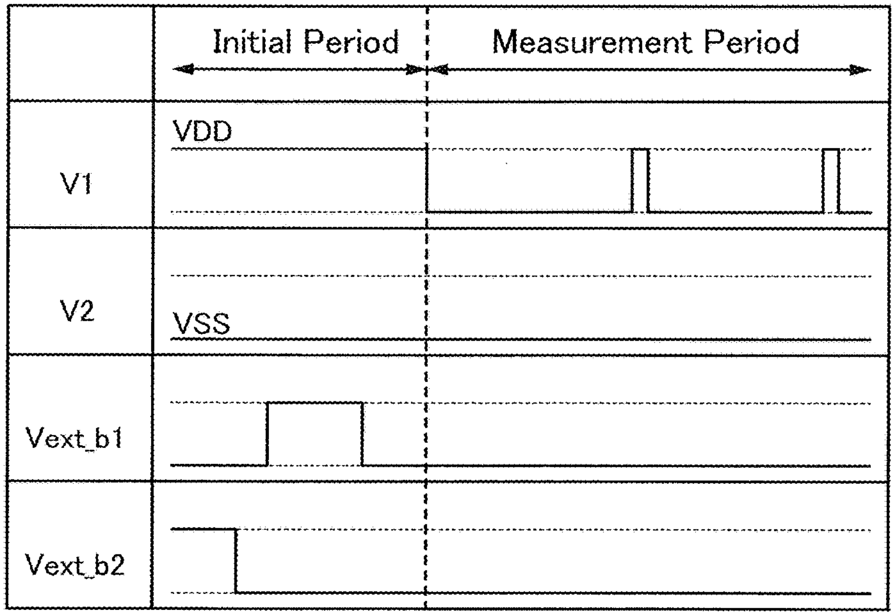
FIG. 5 illustrates a timing chart for evaluating characteristics of a transistor.

Next, a method for measuring current with the use of the element for characteristic evaluation will be described with reference to FIG. 5. The measurement is performed in two sequential periods: an initial period and a measurement period.

First, in the initial period, a node A (i.e., a node electrically connected to the one of the source and the drain of the transistor 1808, the other of the terminals of the capacitor 1802, and the gate of the transistor 1805) is supplied with a high potential. For that, the potential V1 is set to a high potential (VDD) and the potential V2 is set to a low potential (VSS).

Then, the potential Vext_b2 is set to a potential (a high potential) at which the transistor 1804 is turned on, so that the transistor 1804 is turned on. Thus, the potential of the node A comes to be the potential V2, that is, a low potential (VSS). Note that a low potential (VSS) is not necessarily supplied to the node A. After that, the potential Vext_b2 is set to a potential at which the transistor 1804 is turned off (a low potential), so that the transistor 1804 is turned off. After that, the potential Vext_b1 is set to a potential (a high potential) at which the transistor 1808 is turned on, so that the transistor 804 is turned on. Thus, the potential of the node A comes to be the potential V1, that is, a high potential (VDD). After that, the potential Vext_b1 is set to a potential at which the transistor 1808 is turned off, so that the transistor 1808 is turned off. Accordingly, the node A is brought into a floating state with keeping a high potential, and the initial period is finished.

In the following measurement period, the potential V1 and the potential V2 are set to a potential with which charge flows to the node A or a potential with which charge flows from the node A. Here, each of the potential V1 and the potential V2 is set to the low potential (VSS). Note that at the time when the output potential Vout is measured, it is necessary to operate an output circuit and thus temporarily set the potential V1 to a high potential. Note that a period in which the potential V1 is set to a high potential is short, to such a degree that the measurement is not influenced.

In the measurement period, charge transfers from the node A to a wiring supplied with the potential V1 or a wiring supplied with the potential V2 because of the off-state current of the transistor 1804 and the transistor 1808. In other words, the amount of charge held in the node A is varied over time, and in accordance with the variation, the potential of the node A is varied. It means that the potential of the gate of the transistor 1805 is varied.

The amount of charge is measured in such a manner that the potential Vout is measured while the potential Vext_b1 is temporality set to a high potential at regular time intervals. A circuit including the transistor 1805 and the transistor 1806 is an inverter. When the node A is set to a high potential, the potential Vout goes into a low potential. When the node A is set to a low potential, the potential Vout goes into a high potential. The potential of the node A is set to a high potential at first, but the potential is gradually lowered by a decrease in charge. As a result, the potential Vout is also varied. The variation of the potential of the node A is amplified by amplifier action of the inverter, thereby being output to a wiring supplied with the potential Vout.

A method for calculating the off-state current on the basis of the obtained output potential Vout is described below.

The relation between the potential $V_A$ of the node A and the output potential Vout is obtained in advance before the off-state current is calculated. With this, the potential $V_A$ of the node A can be obtained using the output potential Vout. In accordance with the above relationship, the potential $V_A$ of the node A can be expressed as a function of the output potential Vout by the following equation.

$$V_A=F(Vout) \quad \text{[FORMULA 1]}$$

Charge $Q_A$ of the node A can be expressed by the following equation with the use of the potential $V_A$ of the node A, capacitance $C_A$ connected to the node A, and a constant (const). Here, the capacitance $C_A$ electrically connected to the node A is the sum of capacitance of the capacitor 1802 and the other capacitance.

$$Q_A=C_AV_A+\text{const} \quad \text{[FORMULA 2]}$$

Since a current $I_A$ of the node A is obtained by differentiating charge flowing to a capacitor connected to the node A (or charge flowing from the capacitor connected to the node A) with respect to time, the current $I_A$ of the node A is expressed by the following equation.

$$I_A \equiv \frac{\Delta Q_A}{\Delta t} = \frac{C_A \Delta F(Vout)}{\Delta t} \quad \text{[FORMULA 3]}$$

In this manner, the current $I_A$ of the node A can be obtained from the capacitance $C_A$ connected to the node A and the output potential Vout of the output terminal.

In accordance with the above method, it is possible to measure off-state current which flows between a source and a drain of a transistor in an off state.

Manufactured here were the transistor 1804 and the transistor 1808 each having a channel length L of 10 μm and a channel width W of 50 μm and including a highly-purified oxide semiconductor layer. In addition, in the measurement systems 1800 which are arranged in parallel, the capacitances of the capacitors 1802 were 100 fF, 1 pF, and 3 pF.

Note that in the above-described measurement, VDD was 5 V and VSS was 0 V. In the measurement period, the potential V1 was basically set to VSS and set to VDD only in a period of 100 msec every 10 seconds to 300 seconds, and the potential Vout was measured. Δt which was used in calculation of current I which flows through the element was about 30000 sec.

Figure 6:
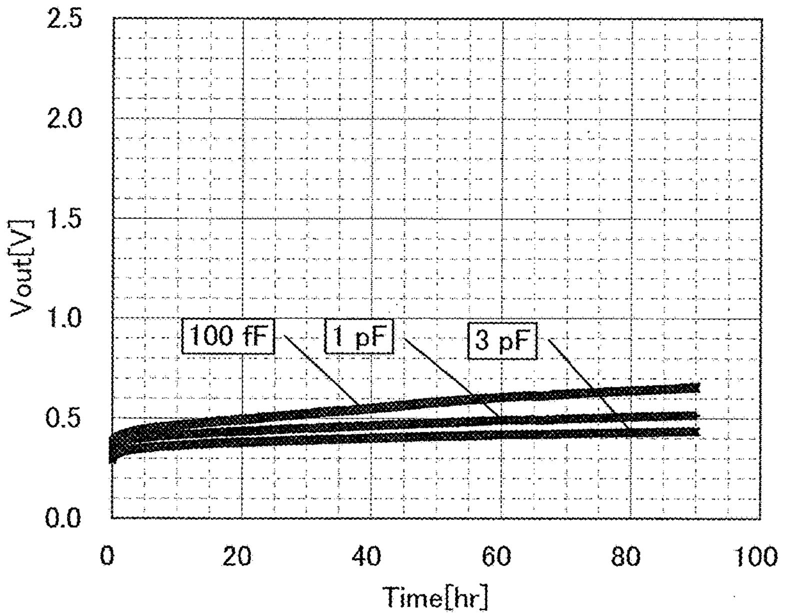
FIG. 6 illustrates characteristics of a transistor.

FIG. 6 shows the relation between the output potential Vout and elapsed time Time in the current measurement. According to FIG. 6, the potential varies as time passes.

Figure 7:
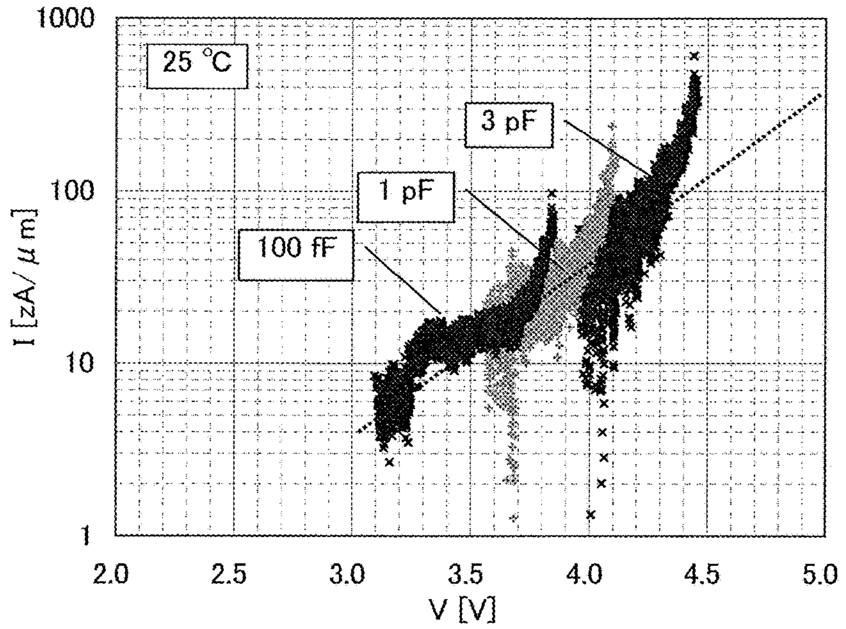
FIG. 7 illustrates characteristics of a transistor.

FIG. 7 shows the off-state current at room temperature (25° C.) calculated based on the above current measurement. Note that FIG. 7 shows the relationship between the source-drain voltage V and the off-state current I of the transistor 1804 or the transistor 1808. FIG. 7 shows that off-state current is about 40 zA/μm under the condition that the source-drain voltage is 4 V. In addition, the off-state current was less than or equal to 10 zA/μm under the condition where the source-drain voltage was 3.1 V. Note that 1 zA represents $10^{-21}$ A.

Figure 8:
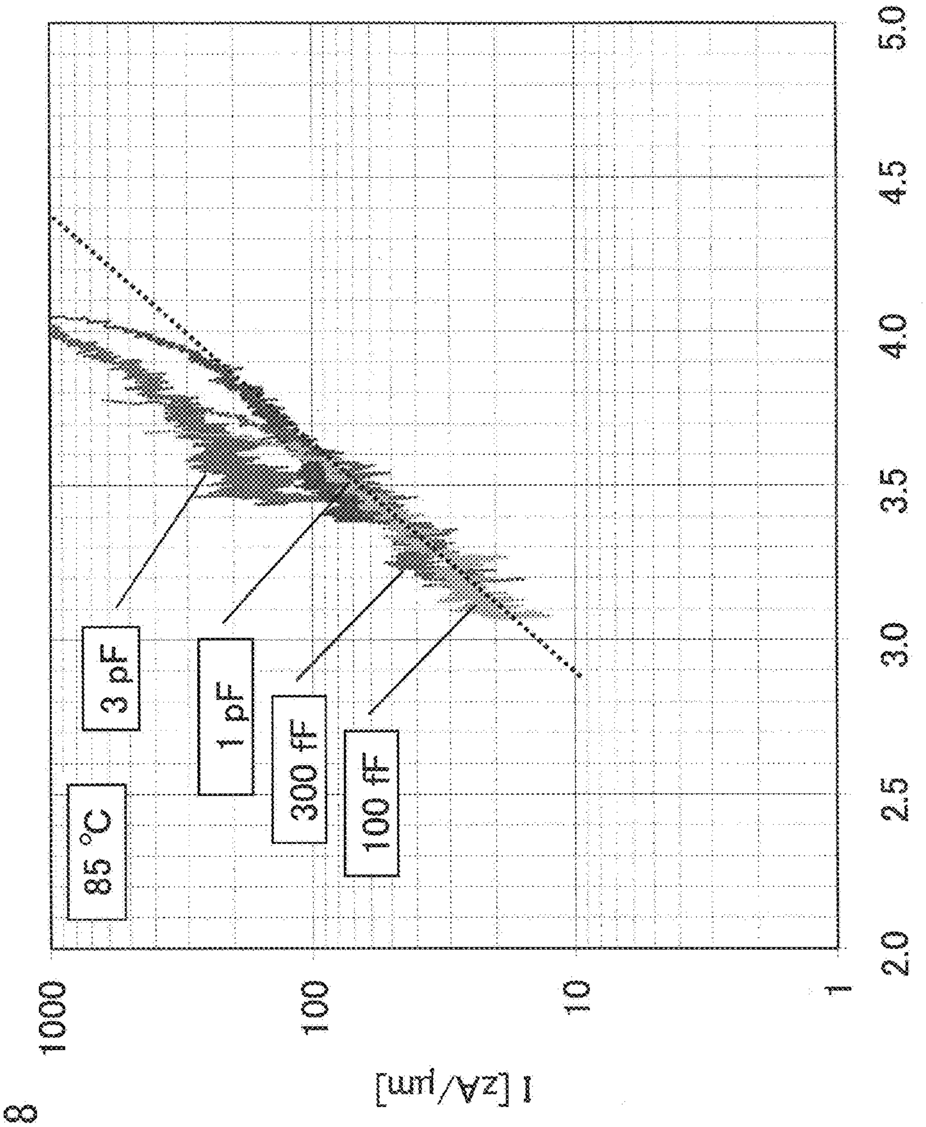
FIG. 8 illustrates characteristics of a transistor.

Furthermore, FIG. 8 shows the off-state current in an environment at a temperature of 85° C., which is calculated in the above current measurement. FIG. 8 shows the relation between the source-drain voltage V and the off-state current I in an environment at 85° C. of the transistor 1804 or the transistor 1808. It is found from FIG. 8 that the off-state current is lower than or equal to 100 zA/μm under the condition where the source-drain voltage is 3.1 V.

According to this example, it was confirmed that the off-state current can be sufficiently low in a transistor including a highly-purified oxide semiconductor layer.

<Structural Example of Backlight 12>

Figure 9:
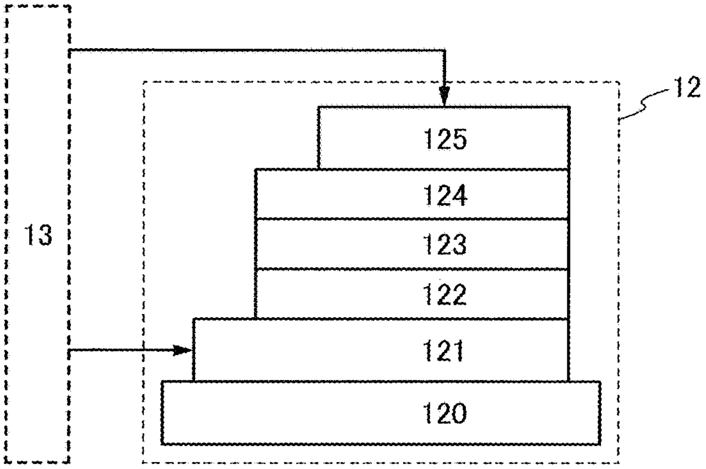
FIG. 9 illustrates a structural example of a backlight.

FIG. 9 illustrates a structural example of the backlight 12 which performs surface light emission. The backlight 12 in FIG. 9 includes a substrate 120, an electrode layer 121 provided over the substrate 120, an organic material layer 122 provided over the electrode layer 121, an intermediate layer 123 provided over the organic material layer 122, an organic material layer 124 provided over the intermediate layer 123, and an electrode layer 125 provided over the organic material layer 124. Note that the potentials of the electrode layer 121 and the electrode layer 125 are controlled by the control circuit 13. Voltage is applied to the electrode layer 121 and the electrode layer 125 by the control circuit 13, so that the backlight 12 emits light. In other words, the backlight 12 in FIG. 9 is a backlight which uses an organic material emitting light by application of voltage as an illuminant (i.e., a backlight using organic EL (organic electroluminescence)).

Figure 10:
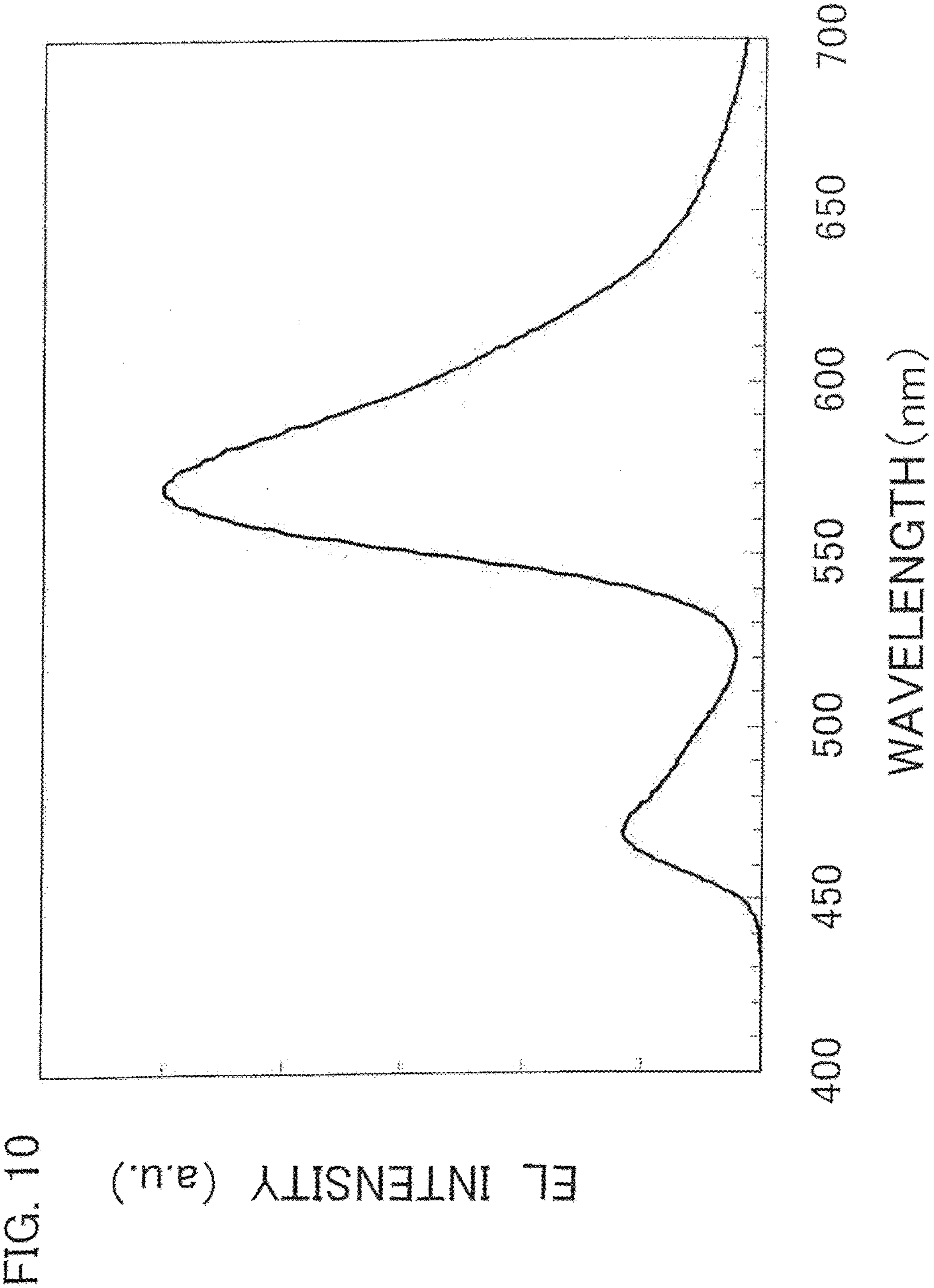
FIG. 10 illustrates an example of an emission spectrum of a backlight.

The backlight 12 in FIG. 9 can emit light with an emission spectrum in FIG. 10 by application of voltage. As illustrated in FIG. 10, the emission spectrum of light emitted from the backlight 12 in FIG. 9 has two peaks. Specifically, the two peaks are in the wavelength range of blue (B) (longer than or equal to 400 nm and less than 480 nm) and the wavelength range of yellow (Y) (longer than or equal to 560 nm and less than 580 nm), respectively. Further, the peak in the wavelength range of yellow (Y) is higher than that of blue (B). These peaks appear because of light emission of different organic material layers. Specifically, light whose emission spectrum corresponds to one of the two peaks is emitted by application of voltage to the organic material layer 122, and light whose emission spectrum corresponds to the other of the two peaks is emitted by application of voltage to the organic material layer 124. Accordingly, the backlight 12 in FIG. 9 can emit light with the emission spectrum in FIG. 10. Note that blue (B) and yellow (Y) are a complementary color for each other, and the light with the emission spectrum in FIG. 10 is white light.

Note that there are a plurality of combinations of light for making white light. For example, white light can be made by mixture in color of cyan light and red light, by mixture in color of sky blue light and vermilion light, or the like. Note that it is preferable to make white light by mixture of blue (B) light and yellow (Y) light whose emission intensity is higher than that of blue (B) light because electrical efficiency can be improved (power consumption can be reduced). The reason is as follows. The visibility of a human eye to light with a wavelength of 555 nm is the highest, and the visibility is lowered as the wavelength of light is apart from 555 nm; that is, in the case of the same photon number, a human perceives light with a wavelength of 555 nm as light with the strongest intensity. Therefore, yellow (Y) light with a wavelength of about 555 nm is used for making white light, so that white light with high visibility can effectively be made.

Note that in the liquid crystal display device, the white light passes through a color filter which transmits only light with the wavelength range of red (R), a color filter which transmits only light with the wavelength range of green (G), and a color filter which transmits only light with the wavelength range of blue (B). Therefore, the light emitted from the backlight needs to include light with the wavelength range of red, light with the wavelength range of green, and light with the wavelength range of blue. Here, white light emitted from the backlight in FIG. 9 is generated with the use of organic EL. In general, an emission spectrum of light generated with the use of organic EL has a broad peak. Accordingly, light with the wavelength range of yellow (Y) generated with the use of organic EL includes light with the wavelength range of red (R), light with the wavelength range of green (G), and light with the wavelength range of blue (B). Thus, the backlight in FIG. 9 can be used as a backlight of the liquid crystal display device.

Examples of a material capable of being used for components of the backlight 12 in FIG. 9 are given below. Note that in the following explanation, the electrode layer 121 is an anode, the organic material layer 122 is an organic material which can emit light with the wavelength range of yellow (Y), the organic material layer 124 is an organic material which can emit light with the wavelength range of blue (B), and the electrode layer 125 is a cathode. However, these components can be changed as appropriate.

The substrate 120 is used as a support. Glass, plastic, or the like can be used for the substrate 120, for example, and other materials also can be used as long as the substrate 120 can serve as a support in process for forming the electrode layer 121, the electrode layer 125, the organic material layer 122, the organic material layer 125, and the intermediate layer 123.

A variety of metals, alloys, other conductive materials, and a mixture thereof can be used for the electrode layers 121 and 125. For example, it is possible to use a film of conductive metal oxide such as indium oxide-tin oxide (ITO: indium tin oxide), indium oxide-tin oxide containing silicon or silicon oxide, indium oxide-zinc oxide (IZO: indium zinc oxide), or indium oxide containing tungsten oxide and zinc oxide (IWZO), which has a high work function. Films of these metal oxides can be formed by a sputtering method, a sol-gel method, or the like. For example, indium oxide-zinc oxide (IZO) can be formed by a sputtering method using indium oxide into which zinc oxide of 1 to 20 wt % is added, as a target. Moreover, indium oxide (IWZO) including tungsten oxide and zinc oxide can be formed by a sputtering method using a target in which 0.5 to 5 wt % of tungsten oxide and 0.1 to 1 wt % of zinc oxide with respect to indium oxide are included. In addition, gold (Au), platinum (Pt), nickel (Ni), tungsten (W), chromium (Cr), molybdenum (Mo), iron (Fe), cobalt (Co), copper (Cu), palladium (Pd), a nitride of a metal material (e.g., titanium nitride (TiN)), or the like can be used. Alternatively, any of elements belonging to Group 1 and 2 of the periodic table, which have a low work function, that is, alkali metals such a lithium (Li) and cesium (Cs) and alkaline earth metals such as magnesium (Mg), calcium (Ca), and strontium (Sr); or alloys containing these metals (e.g., an alloy of magnesium and silver or an alloy of aluminum and lithium) can be used. Further alternatively, a rare earth metal such as europium (Eu), ytterbium (Yb), or the like, an alloy of any of these metals, or the like may be used. Alternatively, aluminum (Al), silver (Ag), an alloy containing aluminum (AlSi), or the like can be used. A film of an alkali metal, an alkaline earth metal, or an alloy thereof can be formed by a vacuum evaporation method. Further, a film formed of an alloy of an alkali metal or an alkaline earth metal can be formed by a sputtering method. Further, each electrode can be formed to have not only a single layer but also stacked layers.

It is to be noted that a material with a high work function is preferably used for the electrode layer 121 serving as the anode in consideration of a carrier injection barrier. In addition, a material with a low work function is preferably used for the electrode layer 125 serving as the cathode.

The organic material layer 122 includes a light-emitting substance which emits light having a peak in the wavelength of yellow (Y). As the light-emitting substance which emits light having a peak in the wavelength range of the yellow (Y), the following can be used: rubrene; (2-{2-[4-(dimethylamino)phenyl]ethenyl}-6-methyl-4H-pyran-4-ylidene) propanedinitrile (abbreviation: DCM1); 2-{2-methyl-6-[2-(2,3,6,7-tetrahydro-1H,5H-benzo[ij]quinolizin-9-yl) ethenyl]-4H-pyran-4-ylidene}propanedinitrile (abbreviation: DCM2); bis[2-(2-thienyl)phridinato]iridium acetylacetonate (abbreviation: $Ir(thp)_2(acac)$); bis(2-phenylquinolinato)iridium acetylacetonate (abbreviation: $Ir(pq)_2(acac)$); tris(2-phenylquinolinato-N,$C^{2'}$)iridium(III) (abbreviation: $Ir(pq)_3$); bis(2-phenylbenzothiazolato-N,$C^{2'}$) iridium(III) acetylacetonate (abbreviation: $Ir(bt)_2(acac)$); (acetylacetonato)bis[2,3-bis(4-fluorophenyl)-5-methylpyrazinato]iridium(III) (abbreviation: $Ir(Fdppr\text{-}Me)_2(acac)$); (acetylacetonato)bis{2-(4-methoxyphenyl)-3,5-dimethylpyrazinato}iridium(III) (abbreviation: $Ir(dmmoppr)_2(acac)$); (acetylacetonato)bis(3,5-dimethyl-2-phenylpyrazinato)iridium(III) (abbreviation: $Ir(mppr\text{-}Me)_2(acac)$); (acetylacetonato)bis(5-isopropyl-3-methyl-2-phenylpyrazinato)iridium(III) (abbreviation: $Ir(mppr\text{-}iPr)_2(acac)$); or the like. As described above, the following phosphorescent compounds are preferable as the light-emitting substance which emits light having a peak in the wavelength range of yellow (Y): $Ir(thp)_2(acac)$, $Ir(pq)_2(acac)$, $Ir(pq)_3$, $Ir(bt)_2(acac)$, $Ir(Fdppr\text{-}Me)_2(acac)$, $Ir(dmmoppr)_2(acac)$, $Ir(mppr\text{-}Me)_2(acac)$, and $Ir(mppr\text{-}iPr)_2(acac)$. The power efficiency in the case of using a phosphorescent compound is three to four times as high as that in the case of using a fluorescent compound. Note that, the lifetime of an element in which a phosphorescent compound which emits yellow (Y) light is used is easily increased compared to an element in which a phosphorescent compound which emits blue (B) light is used. In particular, an organometallic complex in which a pyrazine derivative serves as a ligand, such as $Ir(Fdppr\text{-}Me)_2(acac)$, $Ir(dmmoppr)_2(acac)$, $Ir(mppr\text{-}Me)_2(acac)$, $Ir(mppr\text{-}iPr)_2(acac)$ are preferable because high efficiency is obtained. In addition, any of these light-emitting substances (a guest material) may be dispersed into another substance (a host material) to form the light-emitting layer. As a host material in that case, the following compounds are preferable: aromatic amine compounds such as 4,4'-bis[N-(1-naphthyl)-N-phenylamino]biphenyl (abbreviation: NPB) and 4-(9H-carbazol-9-yl)-4'-(10-phenyl-9-anthryl)triphenylamine (abbreviation: YGAPA); and heterocyclic compounds such as 2-[4-(9H-carbazol-9-yl)phenyl]-3-phenyl quinoxaline (abbreviation: Cz1PQ), 2-[4-(3,6-diphenyl-9H-carbazol-9-yl)phenyl]-3-phenylquinoxaline (abbreviation: Cz1PQ-III), 2-[4-(3,6-diphenyl-9H-carbazol-9-yl)phenyl]dibenzo[f,h] quinoxaline (abbreviation: 2CzPDBq-III), and 2-[3-(dibenzothiophen-4-yl)phenyl]dibenzo[f,h]quinoxaline (abbreviation: 2mDBTPDBq-II). Further alternatively, a polymer, such as poly(2,5-dialkoxy-1,4-phenylenevinylene) may be used.

The intermediate layer 123 has a function of injecting electrons to the organic material layer 122 and injecting holes to the organic material layer 124. Thus, a stacked film in which at least a layer which has a function of injecting holes and a layer which has a function of injecting electrons are stacked can be employed for the intermediate layer 123. Further, the intermediate layer 123 is positioned inside the organic material layers 122 and 124, and thus is preferably formed using a light-transmitting material in terms of light extraction efficiency. In addition, part of the intermediate layer 123 can be formed using the same material as the electrode layers 121 and 125 or a material whose conductivity is lower than that of the electrode layers 121 and 125. In the intermediate layer 123, a layer which has a function of injecting electrons can be formed using lithium oxide, lithium fluoride, cesium carbonate, or the like, or an electron-transport substance to which a donor substance is added.

As a substance with high electron-transport properties, the following can be used, for example: a metal complex having a quinoline skeleton or a benzoquinoline skeleton, such as tris(8-quinolinolato)aluminum (abbreviation: Alq), tris(4-methyl-8-quinolinolato)aluminum (abbreviation: $Almq_3$), bis(10-hydroxybenzo[h]quinolinato)beryllium (abbreviation: $BeBq_2$), or bis(2-methyl-8-quinolinolato)(4-phenylphenolato)aluminum (abbreviation: BAlq); or the like. Alternatively, a metal complex having an oxazole-based or thiazole-based ligand, such as bis[2-(2-hydroxyphenyl)-benzoxazolato]zinc ($Zn(BOX)_2$) or bis[2-(2-hydroxyphenyl)-benzothiazolato]zinc ($Zn(BTZ)_2$) or the like can be used. In addition to the metal complex, 2-(4-biphenylyl)-5-(4-tert-butylphenyl)-1,3,4-oxadiazole (abbreviation: PBD), 1,3-bis[5-(p-tert-butylphenyl)-1,3,4-oxadiazol-2-yl]benzene (abbreviation: OXD-7), 3-(4-biphenylyl)-4-phenyl-5-(4-tert-butylphenyl)-1,2,4-triazole (abbreviation: TAZ), bathophenanthroline (abbreviation: BPhen), bathocuproine (abbreviation: BCP), or the like can be used. The substances given here are mainly substances having an electron mobility of $10^{-6}$ $cm^2/Vs$ or more. Note that any substance other than the above substances may be used as long as the substance has electron-transport properties which are higher than hole-transport properties.

A donor substance is added to a substance with high electron-transport properties, whereby electron-injection properties can be enhanced. Therefore, a drive voltage of the backlight can be reduced. As the donor substance, an alkali metal, an alkaline earth metal, a rare earth metal, a metal that belongs to Group 13 of the periodic table, or an oxide or carbonate thereof can be used. Specifically, lithium (Li), cesium (Cs), magnesium (Mg), calcium (Ca), ytterbium (Yb), indium (In), lithium oxide, cesium carbonate, or the like is preferably used. Alternatively, an organic compound such as tetrathianaphthacene may be used as the donor substance.

In the intermediate layer 123, the layer which has a function of injecting holes can be formed using, for example, molybdenum oxide, vanadium oxide, rhenium oxide, ruthenium oxide, or the like, or an electron-transport substance to which an acceptor substance is added. Alternatively, a layer formed of an acceptor substance may be used.

As the substance having a high hole-transport property, for example, an aromatic amine compound such as 4,4'-bis[N-(1-naphthyl)-N-phenylamino]biphenyl (NPB), N,N'-bis(3-methylphenyl)-N,N'-diphenyl-[1,1'-biphenyl]-4,4'-diamine (TPD), 4,4',4"-tris(N,N-diphenylamino)triphenylamine (TDATA), 4,4',4"-tris[N-(3-methylphenyl)-N-phenylamino]triphenylamine (MTDATA), or 4,4'-bis[N-(spiro-9,9'-bifluoren-2-yl)-N-phenylamino]-1,1'-biphenyl (BSPB), or the like can be used. The substances given here are mainly substances having a hole mobility of $10^{-6}$ $cm^2/Vs$ or more. However, any substance other than the above substances may be used as long as it is a substance in which the hole-transport property is higher than the electron-transport property. Alternatively, the above host material may be used.

An acceptor substance is added to a substance with high hole-transport properties, whereby the hole-injection properties can be enhanced. Thus, the driving voltage of a light-emitting element can be reduced. As an acceptor substance, 7,7,8,8-tetracyano-2,3,5,6-tetrafluoroquinodimethane (abbreviation: $F_4$-TCNQ), chloranil, or the like can be used. Alternatively, a transition metal oxide can be used. Alternatively, an oxide of a metal belonging to Group 4 to Group 8 of the periodic table can be used. Specifically, vanadium oxide, niobium oxide, tantalum oxide, chromium oxide, molybdenum oxide, tungsten oxide, manganese oxide, and rhenium oxide are preferable since their electron-accepting property is high. In particular, molybdenum oxide is especially preferable since it is stable in air, its hygroscopic property is low, and it can be easily handled.

Further, with the structure in which an accepter substance is added to a substance with high hole-transport properties and/or the structure in which a donor substance is added to a substance with high electron-transport properties, an increase in the drive voltage can suppressed even in the case of increasing the thickness of the intermediate layer 123. When the thickness of the intermediate layer 123 is increased, a short circuit caused by a minute foreign object, impact, or the like can be prevented; thus, a highly reliable backlight can be obtained.

Note that, if needed, another layer may be provided between the layer which has a function of injecting holes and the layer which has a function of injecting electrons in the intermediate layer. For example, a conductive layer formed of ITO or the like or an electron-relay layer may be provided. An electron-relay layer has a function of reducing the loss of voltage generated between the layer which has a function of injecting holes and the layer which has a function of injecting electrons. Specifically, a material whose LUMO level is greater than or equal to about −5.0 eV is preferably used, and a material whose LUMO level is greater than or equal to −5.0 eV and less than or equal to −3.0 eV is more preferably used. For example, 3,4,9,10-perylenetetracarboxylicdianhydride (abbreviation: PTCDA), 3,4,9,10-perylenetetracarboxylic-bis-benzimidazole (abbreviation: PTCBI), or the like can be used.

The organic material layer 124 includes a light-emitting substance which emits light having a peak in the blue (B) wavelength. As a light-emitting substance which emits light having a peak in the wavelength range of blue (B), perylene; 2,5,8,11-tetra(tert-butyl)perylene (abbreviation: TBP); or the like can be used. A styrylarylene derivative such as 4,4'-bis(2,2-diphenylvinyl)biphenyl (abbreviation: DPVBi), or an anthracene derivative such as 9,10-diphenylanthracene, 9,10-di(2-naphthyl)anthracene (abbreviation: DNA), or 9,10-bis(2-naphthyl)-2-tert-butylanthracene (abbreviation: t-BuDNA) can be used. A polymer such as poly(9,9-dioctylfluorene) can be used. A styrylamine derivative such as N,N'-bis[4-(9H-carbazol-9-yl)phenyl]-N,N'-diphenylstilbene-4,4'-diamine (abbreviation: YGA2S) or N,N'-diphenyl-N,N'-bis(9-phenyl-9H-carbazol-3-yl)stilbene-4,4'-diamine (PCA2S) can be used. A pyrenediamine derivative such as N,N'-bis[4-(9-phenyl-9H-fluoren-9-yl)phenyl]-N,N'-diphenylpyrene-1,6-diamine (abbreviation: 1,6FLPAPrn) or N,N'-bis[4-(9-phenyl-9H-fluoren-9-yl)phenyl]-N,N'-bis(4-tert-butyl-phenyl)pyrene-1,6-diamine (abbreviation: 1,6tBu-FLPAPrn) can be used. In addition, a fluorescent compound is preferably used as the light-emitting substance which emits light having a peak in the wavelength range of blue. The use of a fluorescent compound as the substance which emits blue (B) light makes it possible to obtain a light-emitting element which has a longer lifetime than a light-emitting element in which a phosphorescent compound is used as the substance which emits blue (B) light. In particular, pyrenediamine derivatives such as 1,6FLPAPrn and 1,6tBu-FLPAPrn are preferable because it has a peak at a wavelength of around 460 nm, has an extremely high quantum yield, and has a long lifetime. In addition, any of these light-emitting substances (a guest material) may be dispersed into another substance (a host material) to form the light-emitting layer. As a host material in that case, an anthracene derivative is preferable, examples of which are 9,10-bis(2-naphthyl)-2-tert-butylanthracene (abbreviation: t-BuDNA), 9-[4-(10-phenyl-9-anthryl)phenyl]-9H-carbazole (abbreviation: CzPA), and 9-phenyl-3-[4-(10-phenyl-9-anthryl)phenyl]-9H-carbazole (abbreviation: PCzPA). In particular, CzPA and PCzPA are preferable because they are electrochemically stable.

<Structural Example of Control Circuit 13>

Figure 11:
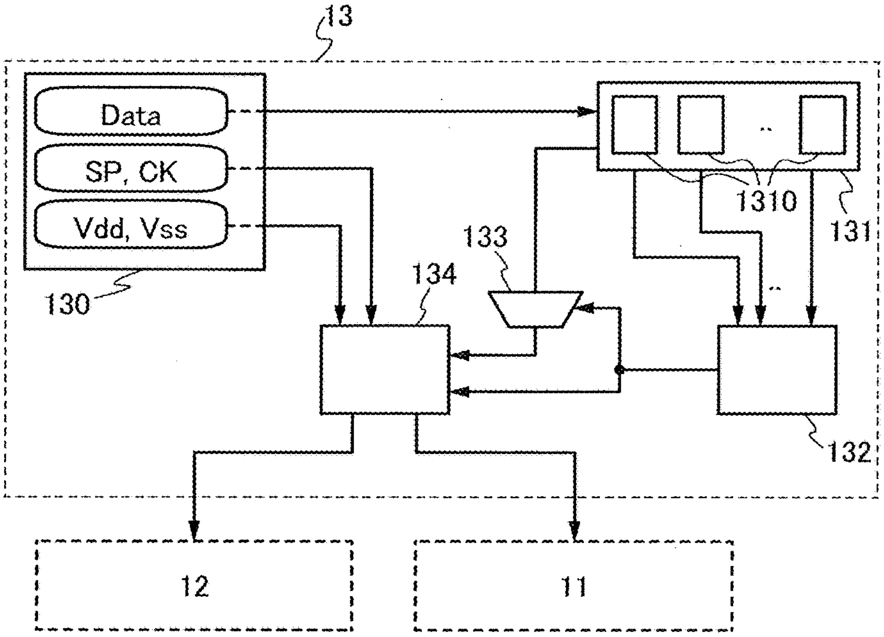
FIG. 11 illustrates a structural example of a control circuit.

FIG. 11 illustrates a structural example of the control circuit 13. The control circuit 13 in FIG. 11 includes a signal generation circuit 130, a storage circuit 131, a comparison circuit 132, a selection circuit 133, and an output control circuit 134.

The signal generation circuit 130 generates a signal with which the display panel 11 is driven so that an image is formed on the pixel portion, and driving voltage with which the backlight 12 emits light. Note that the signal indicates an image signal (Data) input to the plurality of pixels arranged in matrix in the pixel portion 10, a signal for controlling operation of the scan line driver circuit 11 or the signal line driver circuit 12 (e.g., a start pulse signal (SP) and a clock signal (CK)), the high power supply potential (Vdd) and the low power supply potential (Vss) which are power supply voltages for the driver circuit, and the like. Note that in the control circuit 13 illustrated in FIG. 4, the signal generator circuit 130 outputs the image signal (Data) to the storage circuit 131, outputs the signal for controlling operation of the display panel 11 (the scan line driver circuit 111 and the signal line driver circuit 112) and the driving voltage for light emission of the backlight 12 to the display control circuit 134. In the case where the image signal (Data) output from the signal generator circuit 130 to the storage circuit 131 is an analog signal, the image signal (Data) can be converted into a digital signal through an A/D converter or the like.

The memory circuit 131 includes a plurality of memories 1310 which store image signals from an image signal for forming a first image to an image signal for forming an n-th image (n is a natural number greater than or equal to 2) in the pixel portion. The memory 1310 is formed using a storage element such as a dynamic random access memory (DRAM) or a static random access memory (SRAM). The number of memories 1310 is not particularly limited as long as the memory 1310 stores an image signal for each image formed in the pixel portion. Further, image signals stored in the plurality of memories 1310 are selectively read by the comparison circuit 132 and the selection circuit 133.

The comparison circuit 132 selectively reads an image signal for producing a k-th image (k is a natural number greater than or equal to 1 and less than n) and an image signal for producing a (k+1)th image which are stored in the storage circuit 131, compares these image signals, and detects a difference between the image signals. Note that the k-th image and the (k+1)th image are images that are successively displayed on the pixel portion. In the case where a difference is detected by the comparison of the image signals by the comparison circuit 132, two images to be formed using the image signals are assumed to be a moving image. On the other hand, in the case where a difference is not detected by the comparison of the image signals by the comparison circuit 132, two images to be formed using the image signals are assumed to be as a still image. That is, the comparison circuit 132 is a circuit which determines whether the image signals for forming successively displayed images are either image signals for displaying a moving image or image signals for displaying a still image, by the detection of a difference by the comparison circuit 132. Note that the comparison circuit 132 may be set to detect a difference when the difference exceeds a certain level.

The selection circuit 133 selects an output of an image signal to the display panel 11 on the basis of the difference detected by the comparison circuit 132. Specifically, the selection circuit 133 outputs an image signal for forming an image from which a difference is detected in the comparison circuit 132, but does not output an image signal for forming an image from which a difference is not detected in the comparison circuit 132.

The output control circuit 134 controls supply of control signals such as a start pulse signal (SP), a clock signal (CK), a high power supply potential (Vdd), and a low power supply potential (Vss), to the display panel 11 (the scan line driver circuit 111 and the signal line driver circuit 112). Specifically, in the case where images are assumed to be a moving image by the comparison circuit 132 (i.e., in the case where a difference between successively displayed images is detected), an image signal (Data) supplied from the selection circuit 133 is output to the signal line driver circuit 12, and control signals (a start pulse signal (SP), a clock signal (CK), a high power supply potential (Vdd), a low power supply potential (Vss), and the like) are supplied to the display panel 11 (the scan line driver circuit 111 and the signal line driver circuit 112). On the other hand, in the case where images are assumed to be a still image by the comparison circuit 132 (i.e., in the case where a difference between successively displayed images is not detected), an image signal (Data) is not supplied from the selection circuit 133, and control signals (a start pulse signal (SP), a clock signal (CK), a high power supply potential (Vdd), a low power supply potential (Vss), and the like) are not supplied to the display panel 11 (the scan line driver circuit 111 and the signal line driver circuit 112). That is, in the case where images are assumed to be a still image by the comparison circuit 132 (i.e., in the case where a difference between successively displayed images is not detected), the operation of the display panel 11 (the scan line driver circuit 111 and the signal line driver circuit 112) is completely stopped. Further, the output control circuit 134 supplies driving voltage for light emission of the backlight 12 to the backlight 12 whether the output control circuit 134 supplies a signal to the display panel 11.

Furthermore, in the output control circuit 134, in the case where a period during which images are assumed to be a still image by the output control circuit is short, supply of the high power supply potential (Vdd) and the low power supply potential (Vss) can be continued. Note that "supply of the high power supply potential (Vdd) and the low power supply potential (Vss)" means that a potential of a given wiring is fixed to a high power supply potential (Vdd) or a low power supply potential (Vss). That is, a given potential of the wiring is varied to a high power supply potential (Vdd) or a low power supply potential (Vss). Since the variation of potential is accompanied by power consumption, frequent stopping and restarting of supply of a high power supply potential (Vdd) or a low power supply potential (Vss) might result in increase of power consumption. In such a case, it is preferable that a high power supply potential (Vdd) and a low power supply potential (Vss) be continuously supplied. Note that in the foregoing description, “a signal is not supplied” means that a potential which is different from a predetermined potential is supplied to a wiring which supplies the signal, or that the wiring is in a floating state.

Note that the control circuit 13 can have a structure in which in the case where a period during which images are assumed to be a still image is long, a signal or the like is supplied to the display panel 11 again to rewrite an image displayed on the pixel portion (to perform refresh operation); that is, the structure in which an image signal or the like for displaying the still image on the pixel portion is supplied to the display panel 11 again when a period for displaying a still image on the pixel portion exceeds the length which is set for the period.

<Liquid Crystal Display Device Disclosed in this Specification>

A liquid crystal display device disclosed in this specification can control operation of a display panel in accordance with an image displayed on the display panel. Specifically, the liquid crystal display device can control an input of an image signal to a pixel provided in the display panel. For example, power consumption of the liquid crystal display device can be reduced by a reduction in the frequency of inputting the image signal to the pixel. Here, the frequency of inputting the image signal to the pixel is reduced; that is, a period becomes longer in which a transistor for controlling an input of the image signal is off while the image signal is held in the pixel. Thus, in a conventional liquid crystal display device, adversary effect on display of a pixel caused by off-state current of the transistor becomes apparent. Specifically, voltage applied to a liquid crystal element is reduced, whereby display degradation (variation) of a pixel including the liquid crystal element becomes apparent. Note that the off-state current of the transistor is increased in accordance with an increase in the operation temperature. Therefore, there is a strong trade-off between power consumption and display quality in a conventional transmissive liquid crystal display device including a backlight concurrently emitting light and being heated.

On the other hand, the liquid crystal display device disclosed in this specification applies a surface-emission light source to a backlight. The light source has a large light emission area because it is a light source which performs surface light emission. Therefore, the backlight can effectively radiate heat. That means the backlight is a backlight whose temperature increase in light emission is suppressed. In addition, in the liquid crystal display device, an increase in operation temperature of the transistor provided in each pixel can be suppressed. Accordingly, in the liquid crystal display device, an increase in off-state current of the transistor can be suppressed.

In the liquid crystal display device, as a transistor to be provided in each pixel, a transistor whose channel formation region is formed using an oxide semiconductor layer can be used. An increase in the purity of the oxide semiconductor layer allows the conductivity of the oxide semiconductor layer to be as close to intrinsic as possible. Thus, in the oxide semiconductor layer, the generation of carriers due to thermal excitation can be suppressed. As a result, an increase in off-state current along with an increase in the operation temperature of a transistor whose channel formation region is formed using the oxide semiconductor layer can be reduced. That is, the transistor is a transistor in which an increase in off-state current which accompanies an increase in operation temperature is significantly small. Therefore, in the liquid crystal display device, deterioration in display quality can be suppressed even in the case where operation temperature of the transistor is increased in accordance with light emission of the backlight.

As described above, a liquid crystal display device of an embodiment of the present invention applies a light source which is excellent in heat radiation to a backlight. Thus, even in the case where an image signal is not input to a pixel for a long period, the pixel can hold an image signal. In other words, both a reduction in power consumption and a suppression of deterioration in display quality can be realized.

Modification Example

A liquid crystal display device having the above-described structure is one embodiment of the present invention, and a liquid crystal display device different from the liquid crystal display device having the above-described structure in some points is included in the present invention.

<Modification Example of Display Panel>

For example, the case is illustrated where the liquid crystal display device has a structure in which a color filter transmitting light with a wavelength of a given color is provided for each of a plurality of pixels arranged in matrix in the pixel portion of the display panel (see FIG. 1A). However, it is possible to have a structure where a color filter is not provided for part of the plurality of pixels. In other words, although the liquid crystal display device has a structure in which display is performed with the three colors of red (R), green (G), and blue (B), the liquid crystal display device may perform display with the four colors of red (R), green (G), blue (B), and white (W). In this case, brightness can be increased and power consumption can be reduced because the intensity of light is not reduced by a color filter when white is displayed with the liquid crystal display device.

In the aforementioned liquid crystal display device, the bottom-gate transistor called a channel-etched transistor is used for the transistor 11011 provided in each pixel (see FIG. 9); however, the structure of the transistor is not limited to this. For example, the transistor illustrated in FIGS. 12A to 12C can be used.

Figure 12A:
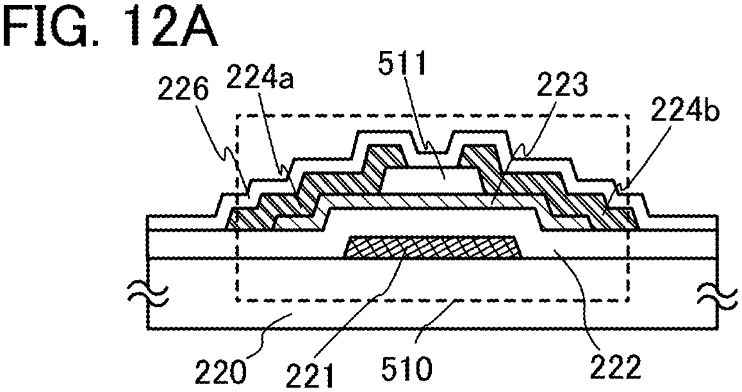
FIGS. 12A to 12C each illustrate a modification example of a transistor.

A transistor 510 illustrated in FIG. 12A has a kind of bottom-gate structure called a channel-protective type (channel-stop type).

The transistor 510 includes, over a substrate 220 having an insulating surface, a gate layer 221, a gate insulating layer 222, an oxide semiconductor layer 223, an insulating layer 511 functioning as a channel protective layer that covers a channel formation region of the oxide semiconductor layer 223, a source layer 224*a*, and a drain layer 224*b*. Moreover, a protective insulating layer 226 is formed which covers the source layer 224*a*, the drain layer 224*b*, and the insulating layer 511.

As the insulating layer 511, an insulator such as silicon oxide, silicon nitride, silicon oxynitride, silicon nitride oxide, aluminum oxide, or tantalum oxide can be used. A stacked structure of these materials can also be used.

Figure 12B:
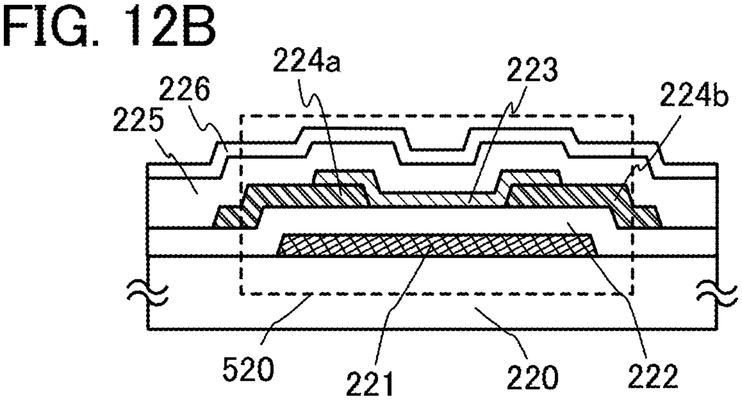

A transistor 520 illustrated in FIG. 12B is a bottom-gate transistor. The transistor 520 includes, over the substrate 220 having an insulating surface, a gate layer 221, the gate insulating layer 222, the source layer 224*a*, the drain layer

224*b*, and the oxide semiconductor layer 223. Furthermore, an insulating layer 225 that covers the source layer 224*a* and the drain layer 224*b* and is in contact with the oxide semiconductor layer 223 is provided. The protective insulating layer 226 is provided over the insulating layer 225.

In the transistor 520, the gate insulating layer 222 is provided on and in contact with the substrate 220 and the gate layer 221, and the source layer 224*a* and the drain layer 224*b* are provided on and in contact with the gate insulating layer 222. Further, the oxide semiconductor layer 223 is provided over the gate insulating layer 222, the source layer 224*a*, and the drain layer 224*b*.

Figure 12C:
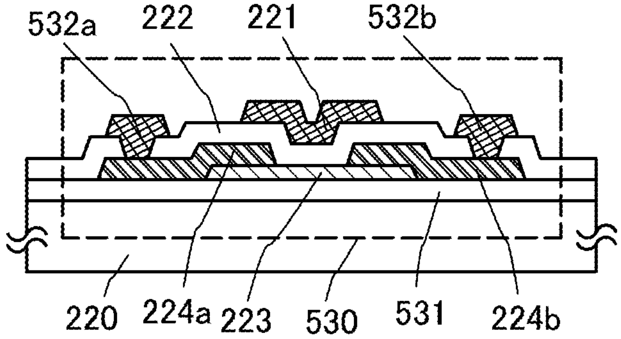

A transistor 530 illustrated in FIG. 12C is a kind of top-gate transistor. The transistor 530 includes, over the substrate 220 having an insulating surface, an insulating layer 531, the oxide semiconductor layer 223, the source layer 224*a* and the drain layer 224*b*, the gate insulating layer 222, and the gate layer 221. A wiring layer 532*a* and a wiring layer 532*b* are provided in contact with the source layer 224*a* and the drain layer 224*b*, to be electrically connected to the source layer 224*a* and the drain layer 224*b*, respectively.

As the insulating layer 531, an insulator such as silicon oxide, silicon nitride, silicon oxynitride, silicon nitride oxide, aluminum oxide, or tantalum oxide can be used. A stacked structure of these materials can also be used.

The wiring layers 532*a* and 532*b* can be formed using an element selected from aluminum (Al), copper (Cu), titanium (Ti), tantalum (Ta), tungsten (W), molybdenum (Mo), chromium (Cr), neodymium (Nd), and scandium (Sc); an alloy containing any of these elements; or a nitride containing any of these elements. A stacked structure of these materials can also be used.

<Modification Example of Backlight>

Figure 13:
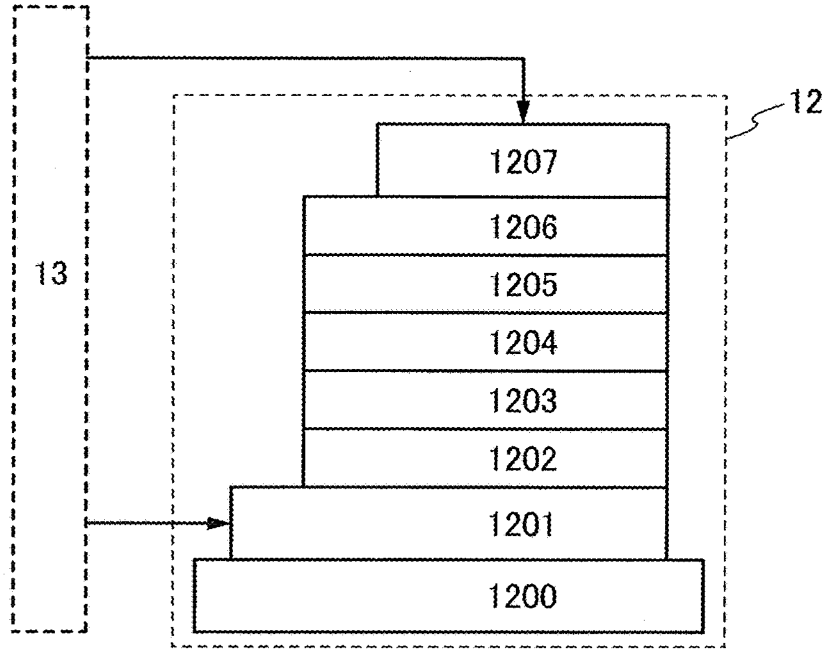
FIG. 13 illustrates a modification example of a backlight.

Further, in the liquid crystal display device, as a backlight, an organic material capable of emitting blue (B) light and an organic material capable of emitting yellow (Y) light are used (see FIG. 9). However, a structure of the backlight is not limited to this. For example, the backlight can include an organic material layer of n layers (n is a natural number greater than or equal to 3). Specifically, the backlight can have a structure illustrated in FIG. 13. The backlight 12 in FIG. 13 includes a substrate 1200, an electrode layer 1201 provided over the substrate 1200, an organic material layer 1202 provided over the electrode layer 1201, an intermediate layer 1203 provided over the organic material layer 1202, an organic material layer 1204 provided over the intermediate layer 1203, an intermediate layer 1205 provided over the organic material layer 1204, an organic material layer 1206 provided over the intermediate layer 1205, and an electrode layer 1207 provided over the organic material layer 1206. Note that the potentials of the electrode layer 1201 and the electrode layer 1207 are controlled by the control circuit 13. In addition, voltage is applied to the electrode layer 1201 and the electrode layer 1207 by the control circuit 13, and thus the organic material layers 1202, 1204, and 1206 each emit light, so that white light can be made. For example, white light can be made in such a manner that each of the organic material layers 1202, 1204, and 1206 emits light with one of wavelength ranges of red (R), green (G), and blue (B) and emits light with a wavelength range of a color different from the colors of light emitted by the other two organic material layers; or one of the organic material layers 1202, 1204, and 1206 emits light with the wavelength range of blue (B) and the other two organic material layers emit light with the wavelength range of yellow (Y). Note that the color filter which transmits only light with the wavelength range of red (R), green (G), and blue (B) is provided for the display panel 11 of the liquid crystal display device. Thus, in the case where white light emitted from the backlight 12 is made by mixture of red (R), green (G), and blue (B), the color purity of red (R) and green (G) displayed on the display panel 11 can be improved. Accordingly, the image quality of the liquid crystal display device can be improved.

As an organic material emitting light with the wavelength range of red (R), the following can be given: fluorescent compound such as N,N,N',N'-tetrakis(4-methylphenyl)tetracene-5,11-diamine (abbreviation: p-mPhTD), 7,14-diphenyl-N,N,N',N'-tetrakis(4-methylphenyl)acenaphtho[1,2-a]fluoranthene-3,10-diamine (abbreviation: p-mPhAFD), 2-{2-isopropyl-6-[2-(1,1,7,7-tetramethyl-2,3,6,7-tetrahydro-1H,5H-benzo[ij]quinolizin-9-yl)ethenyl]-4H-pyran-4-ylidene}propanedinitrile (abbreviation: DCJTI), 2-{2-tert-butyl-6-[2-(1,1,7,7-tetramethyl-2,3,6,7-tetrahydro-1H,5H-benzo[ij]quinolizin-9-yl)ethenyl]-4H-pyran-4-ylidene}propanedinitrile (abbreviation: DCJTB), 2-(2,6-bis{2-[4-(dimethylamino)phenyl]ethenyl}-4H-pyran-4-ylidene)propanedinitrile (abbreviation: BisDCM), 2-{2,6-bis[2-(8-methoxy-1,1,7,7-tetramethyl-2,3,6,7-tetrahydro-1H,5H-benzo[ij]quinolizin-9-yl)ethenyl]-4H-pyran-4-ylidene}propanedinitrile (abbreviation: BisDCJTM), and the like; and phosphorescent compound such as bis[2-(2'-benzo[4,5-a]thienyl)pyridinato-N, $C^{3'}$]iridium(III)acetylacetonate (abbreviation: $Ir(btp)_2(acac)$), bis(1-phenylisoquinolinato-N,$C^{2'}$)iridium(III)acetylacetonate (abbreviation: $Ir(piq)_2(acac)$), (acetylacetonato)bis[2,3-bis(4-fluorophenyl)quinoxalinato]iridium(III) (abbreviation: $Ir(Fdpq)_2(acac)$), (acetylacetonato)bis(2,3,5-triphenylpyrazinato)iridium(III) (abbreviation: $Ir(tppr)_2(acac)$), 2,3,7,8,12,13,17,18-octaethyl-21H,23H-porphyrinplatinum(II) (abbreviation: PtOEP), tris(1,3-diphenyl-1,3-propanedionato)(monophenanthroline)europium(III) (abbreviation: $Eu(DBM)_3(Phen)$), tris[1-(2-thenoyl)-3,3,3-trifluoroacetonato](monophenanthroline)europium(III) (abbreviation: $Eu(TTA)_3(Phen)$), and the like.

As an organic material emitting light with the wavelength range of green (G), the following can be given: fluorescent compound such as coumarin 30, N-(9,10-diphenyl-2-anthryl)-N,9-diphenyl-9H-carbazol-3-amine (abbreviation: 2PCAPA), N-[9,10-bis(1,1'-biphenyl-2-yl)-2-anthryl]-N,9-diphenyl-9H-carbazol-3-amine (abbreviation: 2PCABPhA), N-(9,10-diphenyl-2-anthryl)-N, N',N'-triphenyl-1,4-phenylenediamine (abbreviation: 2DPAPA), N-[9,10-bis(1,1'-biphenyl-2-yl)-2-anthryl]-N,N',N'-triphenyl-1,4-phenylenediamine (abbreviation: 2DPABPhA), 9,10-bis(1,1'-biphenyl-2-yl)-N-[4-(9H-carbazol-9-yl)phenyl]-N-phenylanthracen-2-amine (abbreviation: 2YGABPhA), N,N,9-triphenylanthracen-9-amine (abbreviation: DPhAPhA), coumarin 545T, N,N'-diphenylquinacridone (abbreviation: DPQd), and the like; and phosphorescent compound such as tris(2-phenylpyridinato)iridium(III) (abbreviation: $Ir(ppy)_3$), bis(2-phenylpyridinato)iridium(III) acetylacetonato (abbreviation: $Ir(ppy)_2(acac)$), tris(acetylacetonato)(monophenanthroline)terbium(III) (abbreviation: $Tb(acac)_3(Phen)$), and the like.

An organic material emitting light with the wavelength range of green (G) is already shown; therefore, the above description is referred to here. Note that the substrate 1200 can be formed using the same material as the substrate 120, the electrode layers 1201 and 1207 can be formed using the same material as the electrode layers 121 and 125, and the intermediate layers 1203 and 1205 can be formed using the same material as the intermediate layer 123.

<Modification Example of Control Circuit 13>

Further, the liquid crystal display device has a structure in which the control circuit controls the supply of a signal to the display panel depending on whether or not a difference between successively displayed images is detected by comparison of the images (see FIG. 11). However, the structure of the control circuit is not limited to this. For example, a plurality of modes can be switched in accordance with a signal input from the outside to the control circuit.

Specifically, a structure can be applied in which a user operates an input device provided for the liquid crystal display device to select a moving image mode or a still image mode. Here, the moving image mode is a mode for rewriting an image displayed on the display panel at a first frequency, and the still image mode is a mode for rewriting an image displayed on the display panel at a second frequency lower than the first frequency. In other words, the liquid crystal display device disclosed in this specification includes a liquid crystal display device, the frequency of which of inputting an image signal to the pixel can be intentionally controlled by a user, as well as a liquid crystal display device which automatically controls the frequency of inputting an image signal to the pixel.

Further, the following structure or the like can be employed: the moving image mode or the still image mode is selected in accordance with a kind of an image to be displayed on the liquid crystal display device. For example, a structure can be employed in which the moving image mode or the still image mode is selected in accordance with the file format of electronic data which is the base of an image signal.

<Various Electronic Devices Including Liquid Crystal Display Device>

Examples of electronic devices each including the liquid crystal display device disclosed in this specification will be described below with reference to FIGS. 14A to 14F.

Figure 14A:
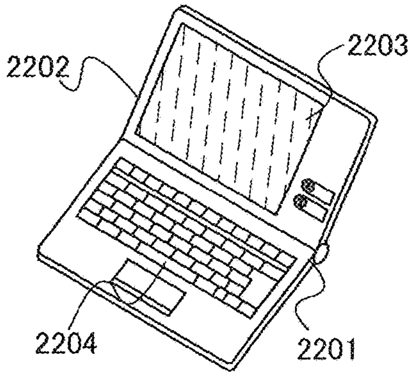
FIGS. 14A to 14F each illustrate an example of an electronic device.

FIG. 14A illustrates a laptop computer, which includes a main body 2201, a housing 2202, a display portion 2203, a keyboard 2204, and the like.

Figure 14B:
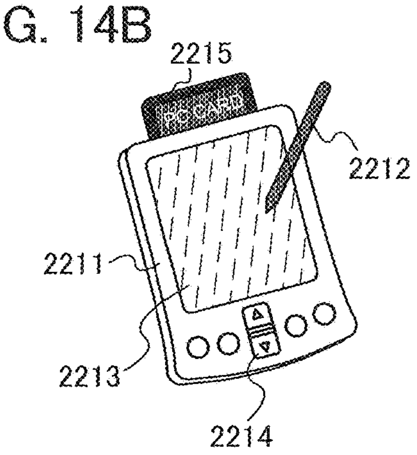

FIG. 14B illustrates a personal digital assistant (PDA), which includes a main body 2211 having a display portion 2213, an external interface 2215, an operation button 2214, and the like. A stylus 2212 for operation is included as an accessory.

Figure 14C:
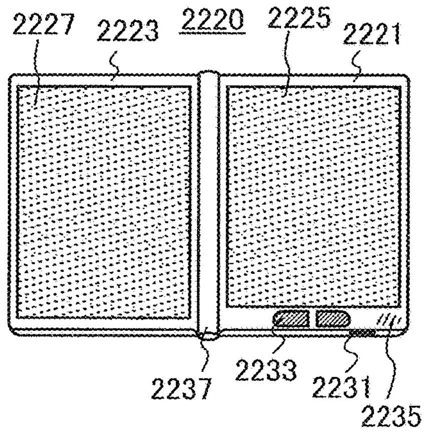

FIG. 14C illustrates an e-book reader 2220 as an example of electronic paper. The e-book reader 2220 includes two housings: housings 2221 and 2223. The housings 2221 and 2223 are bound with each other by an axis portion 2237, along which the e-book reader 2220 can be opened and closed. With such a structure, the e-book reader 2220 can be used as paper books.

A display portion 2225 is incorporated in the housing 2221, and a display portion 2227 is incorporated in the housing 2223. The display portion 2225 and the display portion 2227 may display one image or different images. In the structure where the display portions display different images from each other, for example, the right display portion (the display portion 2225 in FIG. 14C) can display text and the left display portion (the display portion 2227 in FIG. 14C) can display images.

Further, in FIG. 14C, the housing 2221 is provided with an operation portion and the like. For example, the housing 2221 is provided with a power supply 2231, an operation key 2233, a speaker 2235, and the like. With the operation key 2223, pages can be turned. Note that a keyboard, a pointing device, or the like may also be provided on the surface of the housing, on which the display portion is provided. Furthermore, an external connection terminal (an earphone terminal, a USB terminal, a terminal that can be connected to various cables such as an AC adapter and a USB cable, or the like), a recording medium insertion portion, and the like may be provided on the back surface or the side surface of the housing. Further, the e-book reader 2220 may have a function of an electronic dictionary.

The e-book reader 2220 may be configured to transmit and receive data wirelessly. Through wireless communication, desired book data or the like can be purchased and downloaded from an electronic book server.

Note that electronic paper can be applied to devices in a variety of fields as long as they display information. For example, electronic paper can be used for posters, advertisement in vehicles such as trains, display in a variety of cards such as credit cards, and the like in addition to e-book readers.

Figure 14D:
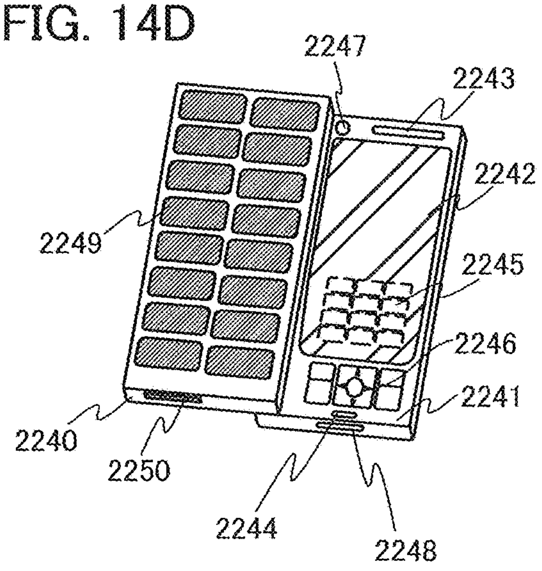

FIG. 14D illustrates a mobile phone. The mobile phone includes two housings: housings 2240 and 2241. The housing 2241 is provided with a display panel 2242, a speaker 2243, a microphone 2244, a pointing device 2246, a camera lens 2247, an external connection terminal 2248, and the like. The housing 2240 is provided with a solar cell 2249 charging of the mobile phone, an external memory slot 2250, and the like. An antenna is incorporated in the housing 2241.

The display panel 2242 has a touch panel function. A plurality of operation keys 2245 which are displayed as images is illustrated by dashed lines in FIG. 14D. Note that the mobile phone includes a booster circuit for increasing a voltage output from the solar cell 2249 to a voltage needed for each circuit. Moreover, the mobile phone can include a contactless IC chip, a small recording device, or the like in addition to the above structure.

The display orientation of the display panel 2242 appropriately changes in accordance with the application mode. Further, the camera lens 2247 is provided on the same surface as the display panel 2242, and thus it can be used as a video phone. The speaker 2243 and the microphone 2224 can be used for videophone calls, recording, and playing sound, etc. as well as voice calls. Moreover, the housings 2240 and 2241 in a state where they are developed as illustrated in FIG. 14D can be slid so that one is lapped over the other; therefore, the size of the portable phone can be reduced, which makes the portable phone suitable for being carried.

The external connection terminal 2248 can be connected to an AC adapter or a variety of cables such as a USB cable, which enables charging of the mobile phone and data communication between the mobile phone or the like. Moreover, a larger amount of data can be saved and moved by inserting a recording medium to the external memory slot 2250. Further, in addition to the above functions, an infrared communication function, a television reception function, or the like may be provided.

Figure 14E:
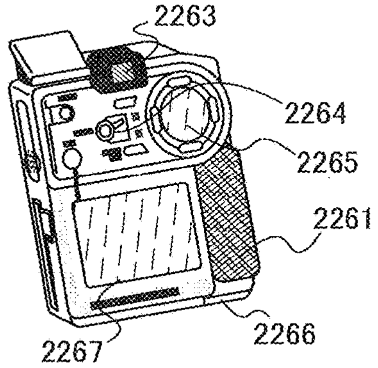

FIG. 14E illustrates a digital camera, which includes a main body 2261, a display portion (A) 2267, an eyepiece 2263, an operation switch 2264, a display portion (B) 2265, a battery 2266, and the like.

Figure 14F:
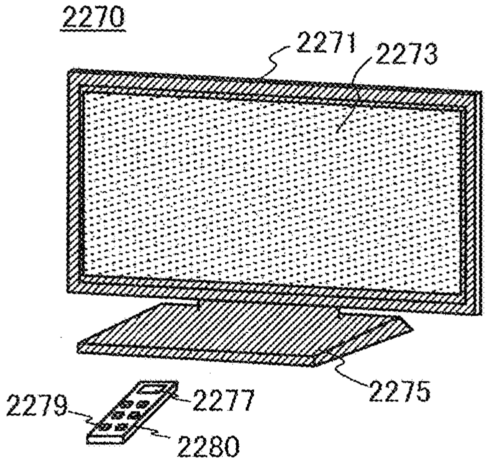

FIG. 14F illustrates a television set. In a television set 2270, a display portion 2273 is incorporated in a housing 2271. The display portion 2273 can display images. Here, the housing 2271 is supported by a stand 2275.

The television set 2270 can be operated by an operation switch of the housing 2271 or a separate remote controller 2280. Channels and volume can be controlled with an operation key 2279 of the remote controller 2280 so that an image displayed on the display portion 2273 can be controlled. Moreover, the remote controller 2280 may have a display portion 2227 in which the information outgoing from the remote controller 2280 is displayed.

Note that the television set 2270 is preferably provided with a receiver, a modem, and the like. A general television broadcast can be received with the receiver. Moreover, when the television set is connected to a communication network with or without wires via the modem, one-way (from a sender to a receiver) or two-way (between a sender and a receiver or between receivers) data communication can be performed.

This application is based on Japanese Patent Application serial no. 2010-103714 filed with Japan Patent Office on Apr. 28, 2010, the entire contents of which are hereby incorporated by reference.

What is claimed is:

1. A display device comprising:

a display panel;

a control circuit configured to control input of an image signal carrying data of images to the display panel; and a pixel portion in the display panel, pixels of the pixel portion each including a transistor configured to control an input of the image signal into the corresponding pixel, wherein the control circuit is configured to not supply the image signal to the display panel in a case where two successive ones of the images are determined to be identical, and wherein the control circuit comprises:

a storage circuit configured to store data for forming first to n-th images (n is a natural number greater than or equal to 2) in the pixel portion;

a comparison circuit configured to compare data for forming the k-th image (k is a natural number less than n) and data for forming the (k+1)-th image to detect a difference;

a selection circuit configured to select an output of data for forming the (k+1)-th image to the pixel portion in accordance with the difference; and an output control circuit configured to supply a control signal to the display panel in a case where the difference is detected, and configured to stop supplying the control signal to the display panel in a case where the difference is not detected.

2. The display device according to claim 1, wherein pixels of the pixel portion each include a transistor configured to control an input of the image signal into the corresponding pixel, and wherein a channel formation region of the transistor comprises an oxide semiconductor.

3. A display device comprising:

a display panel;

a control circuit configured to control input of an image signal carrying data of images to the display panel;

a pixel portion in the display panel, pixels of the pixel portion each including a transistor configured to control an input of the image signal into the corresponding pixel and a liquid crystal element configured to be supplied with voltage in accordance with the image signal; and an organic electroluminescent material as a light source adjacent to the liquid crystal element, wherein the control circuit is configured to not supply the image signal to the display panel in a case where two successive ones of the images are determined to be identical, and wherein the control circuit comprises:

a storage circuit configured to store data for forming first to n-th images (n is a natural number greater than or equal to 2) in the pixel portion;

a comparison circuit configured to compare data for forming the k-th image (k is a natural number less than n) and data for forming the (k+1)-th image to detect a difference;

a selection circuit configured to select an output of data for forming the (k+1)-th image to the pixel portion in accordance with the difference; and an output control circuit configured to supply a control signal to the display panel in a case where the difference is detected, and configured to stop supplying the control signal to the display panel in a case where the difference is not detected.

4. The display device according to claim 3, wherein the light source is a surface-emission light source overlapping with the liquid crystal element configured to be operated as a backlight for the liquid crystal element.

5. A display device comprising:

a display panel;

a control circuit configured to control input of an image signal carrying data of images to the display panel;

a pixel portion in the display panel, pixels of the pixel portion each including a transistor configured to control an input of the image signal into the corresponding pixel and a liquid crystal element configured to be supplied with voltage in accordance with the image signal; and an organic electroluminescent material as a light source adjacent to the liquid crystal element, wherein each of the transistors comprises a channel formation region including an oxide semiconductor, wherein the control circuit is configured to not supply the image signal to the display panel in a case where two successive ones of the images are determined to be identical, and wherein the control circuit comprises:

a storage circuit configured to store data for forming first to n-th images (n is a natural number greater than or equal to 2) in the pixel portion;

a comparison circuit configured to compare data for forming the k-th image (k is a natural number less than n) and data for forming the (k+1)-th image to detect a difference;

a selection circuit configured to select an output of data for forming the (k+1)-th image to the pixel portion in accordance with the difference; and an output control circuit configured to supply a control signal to the display panel in a case where the difference is detected, and configured to stop supplying the control signal to the display panel in a case where the difference is not detected.

6. The display device according to claim 5, wherein the light source is a surface-emission light source overlapping with the liquid crystal element configured to be operated as a backlight for the liquid crystal element.

7. The display device according to claim 1, wherein the control circuit is configured to select a first frequency of inputting the image signal to the display panel for displaying a moving image or a second frequency of inputting the image signal to the display panel for displaying a still image.

8. The display device according to claim 3, wherein the control circuit is configured to select a first frequency of inputting the image signal to the display panel for displaying a moving image or a second frequency of inputting the image signal to the display panel for displaying a still image.

9. The display device according to claim 5, wherein the control circuit is configured to select a first frequency of inputting the image signal to the display panel for displaying a moving image or a second frequency of inputting the image signal to the display panel for displaying a still image.

10. An electronic device including the display device according to claim 1, wherein the electronic device is selected from the group consisting of a laptop computer, a personal digital assistant, an e-book reader, a mobile phone, a digital camera, and a television set.

11. An electronic device including the display device according to claim 3, wherein the electronic device is selected from the group consisting of a laptop computer, a personal digital assistant, an e-book reader, a mobile phone, a digital camera, and a television set.

12. An electronic device including the display device according to claim 5, wherein the electronic device is selected from the group consisting of a laptop computer, a personal digital assistant, an e-book reader, a mobile phone, a digital camera, and a television set.

* * * * *